United States Patent
Cousins et al.

(10) Patent No.: US 11,526,859 B1
(45) Date of Patent: Dec. 13, 2022

(54) CASH FLOW FORECASTING USING A BOTTOMS-UP MACHINE LEARNING APPROACH

(71) Applicant: Bottomline Technologies, SARL, Geneva (CH)

(72) Inventors: Peter Cousins, Rye, NH (US); Edouard Joliveau, Vetraz-Monthoux (FR)

(73) Assignee: Bottomline Technologies, SARL, Geneva (CH)

( * ) Notice: Subject to any disclaimer, the term of this patent is extended or adjusted under 35 U.S.C. 154(b) by 0 days.

(21) Appl. No.: 17/012,548

(22) Filed: Sep. 4, 2020

Related U.S. Application Data

(63) Continuation-in-part of application No. 16/680,652, filed on Nov. 12, 2019.

(51) Int. Cl.

| | |
|---|---|
| *G06Q 20/10* | (2012.01) |
| *G06Q 40/02* | (2012.01) |
| *G06Q 20/04* | (2012.01) |
| *G06N 20/00* | (2019.01) |
| *G06Q 40/00* | (2012.01) |
| *G06Q 10/04* | (2012.01) |
| *G06Q 20/02* | (2012.01) |

(52) U.S. Cl.
CPC .......... *G06Q 20/108* (2013.01); *G06N 20/00* (2019.01); *G06Q 10/04* (2013.01); *G06Q 20/02* (2013.01); *G06Q 20/047* (2020.05); *G06Q 40/02* (2013.01); *G06Q 40/12* (2013.12)

(58) Field of Classification Search
None
See application file for complete search history.

(56) References Cited

U.S. PATENT DOCUMENTS

| | | |
|---|---|---|
| 3,573,747 A | 4/1971 | Adams et al. |
| 3,688,276 A | 8/1972 | Quinn |
| | (Continued) | |

FOREIGN PATENT DOCUMENTS

| | | |
|---|---|---|
| CA | 2191640 A1 | 5/1998 |
| GB | 1489572 A | 10/1977 |
| | (Continued) | |

OTHER PUBLICATIONS

Hua, et al., "A Brief Review of Machine Learning and its Application", 2009, Information Engineering Institute Capital Normal University, entire document pertinent (Year: 2009).*

(Continued)

*Primary Examiner* — Paul S Schwarzenberg
(74) *Attorney, Agent, or Firm* — Richard A. Baker, Jr.

(57) ABSTRACT

A method and apparatus for improving the management of cash and liquidity of an organization utilizing a plurality of ledger accounts and a plurality of currency accounts is described. One improvement in the accuracy of the forecasts comes from the uses of individual ledger accounts. The improvements optimize the interest earnings for the cash balances in each currency account and minimizes the expenses related to funding the currency accounts. Machine learning techniques are incorporated to forecast payments, receipts, interest rates, and currency exchange rates, and then the cash is transferred or borrowed or loaned to fund the payments and utilize available cash.

16 Claims, 21 Drawing Sheets

(56) References Cited

U.S. PATENT DOCUMENTS

| | | |
|---|---|---|
| 4,186,438 A | 1/1980 | Benson et al. |
| 4,346,442 A | 8/1982 | Musmanno |
| 4,376,978 A | 3/1983 | Musmanno |
| 4,449,186 A | 5/1984 | Kelly et al. |
| 4,484,304 A | 11/1984 | Anderson et al. |
| 4,604,686 A | 8/1986 | Reiter et al. |
| 4,674,044 A | 6/1987 | Kalmus et al. |
| 4,677,552 A | 6/1987 | Sibley, Jr. |
| 4,694,397 A | 9/1987 | Grant et al. |
| 4,713,761 A | 12/1987 | Sharpe et al. |
| 4,759,063 A | 7/1988 | Chaum |
| 4,759,064 A | 7/1988 | Chaum |
| 4,799,156 A | 1/1989 | Shavit et al. |
| 4,823,264 A | 4/1989 | Deming |
| 4,868,877 A | 9/1989 | Fischer |
| 4,914,698 A | 4/1990 | Chaum |
| 4,926,480 A | 5/1990 | Chaum |
| 4,947,430 A | 8/1990 | Chaum |
| 4,949,380 A | 8/1990 | Chaum |
| 4,979,206 A | 12/1990 | Padden et al. |
| 4,987,593 A | 1/1991 | Chaum |
| 4,991,210 A | 2/1991 | Chaum |
| 4,996,711 A | 2/1991 | Chaum |
| 5,007,084 A | 4/1991 | Materna et al. |
| 5,111,395 A | 5/1992 | Smith et al. |
| 5,121,945 A | 6/1992 | Thomson et al. |
| 5,122,959 A | 6/1992 | Nathanson et al. |
| 5,131,039 A | 7/1992 | Chaum |
| 5,220,501 A | 6/1993 | Lawlor et al. |
| 5,222,018 A | 6/1993 | Sharpe et al. |
| 5,225,978 A | 7/1993 | Petersen et al. |
| 5,276,736 A | 1/1994 | Chaum |
| 5,283,829 A | 2/1994 | Anderson |
| 5,287,270 A | 2/1994 | Hardy et al. |
| 5,295,256 A | 3/1994 | Bapat |
| 5,326,959 A | 7/1994 | Perazza |
| 5,339,392 A | 8/1994 | Risberg et al. |
| 5,367,624 A | 11/1994 | Cooper |
| 5,373,558 A | 12/1994 | Chaum |
| 5,383,113 A | 1/1995 | Kight et al. |
| 5,424,938 A | 6/1995 | Wagner et al. |
| 5,440,744 A | 8/1995 | Jacobson et al. |
| 5,465,206 A | 11/1995 | Hilt et al. |
| 5,483,445 A | 1/1996 | Pickering |
| 5,544,320 A | 8/1996 | Konrad |
| 5,619,710 A | 4/1997 | Travis et al. |
| 5,649,117 A | 7/1997 | Landry |
| 5,659,616 A | 8/1997 | Sudia |
| 5,668,953 A | 9/1997 | Sloo |
| 5,677,955 A | 10/1997 | Doggett et al. |
| 5,689,565 A | 11/1997 | Spies et al. |
| 5,694,551 A | 12/1997 | Doyle et al. |
| 5,696,901 A | 12/1997 | Konrad |
| 5,699,528 A | 12/1997 | Hogan |
| 5,710,887 A | 1/1998 | Chelliah et al. |
| 5,712,789 A | 1/1998 | Radican |
| 5,727,249 A | 3/1998 | Pollin |
| 5,745,755 A | 4/1998 | Covey |
| 5,772,585 A | 6/1998 | Lavin et al. |
| 5,794,212 A | 8/1998 | Mistr, Jr. |
| 5,794,221 A | 8/1998 | Egendorf |
| 5,832,460 A | 11/1998 | Bednar et al. |
| 5,842,185 A | 11/1998 | Chancey et al. |
| 5,845,283 A | 12/1998 | Williams et al. |
| 5,848,400 A | 12/1998 | Chang |
| 5,852,722 A | 12/1998 | Hamilton |
| 5,860,068 A | 1/1999 | Cook |
| 5,862,325 A | 1/1999 | Reed et al. |
| 5,864,827 A | 1/1999 | Wilson |
| 5,873,072 A | 2/1999 | Kight et al. |
| 5,878,419 A | 3/1999 | Carter |
| 5,884,288 A | 3/1999 | Chang et al. |
| 5,884,325 A | 3/1999 | Bauer et al. |
| 5,893,076 A | 4/1999 | Hafner et al. |
| 5,893,080 A | 4/1999 | McGurl et al. |
| 5,895,450 A | 4/1999 | Sloo |
| 5,897,645 A | 4/1999 | Watters |
| 5,899,982 A | 5/1999 | Randle |
| 5,910,896 A | 6/1999 | Hahn-Carlson |
| 5,918,217 A | 6/1999 | Maggioncalda et al. |
| 5,920,847 A | 7/1999 | Kolling et al. |
| 5,943,656 A | 8/1999 | Crooks et al. |
| 5,953,706 A | 9/1999 | Patel |
| 5,956,688 A | 9/1999 | Kokubo et al. |
| 5,956,700 A | 9/1999 | Landry |
| 5,963,925 A | 10/1999 | Kolling et al. |
| 5,966,531 A | 10/1999 | Skeen et al. |
| 5,970,475 A | 10/1999 | Barnes et al. |
| 5,970,482 A | 10/1999 | Pham et al. |
| 5,978,780 A | 11/1999 | Watson |
| 5,999,937 A | 12/1999 | Ellard |
| 6,032,132 A | 2/2000 | Nelson |
| 6,032,133 A | 2/2000 | Hilt et al. |
| 6,035,285 A | 3/2000 | Schlect et al. |
| 6,041,312 A | 3/2000 | Bickerton et al. |
| 6,044,362 A | 3/2000 | Neely |
| 6,049,799 A | 4/2000 | Mangat et al. |
| 6,052,671 A | 4/2000 | Crooks et al. |
| 6,052,674 A | 4/2000 | Zervides et al. |
| 6,052,785 A | 4/2000 | Lin et al. |
| 6,058,380 A | 5/2000 | Anderson et al. |
| 6,061,449 A | 5/2000 | Delore et al. |
| 6,070,150 A | 5/2000 | Remington et al. |
| 6,078,907 A | 6/2000 | Lamm |
| 6,081,790 A | 6/2000 | Rosen |
| 6,104,798 A | 8/2000 | Lickiss et al. |
| 6,128,603 A | 10/2000 | Dent et al. |
| 6,154,748 A | 11/2000 | Gupta et al. |
| 6,173,272 B1 | 1/2001 | Thomas et al. |
| 6,189,003 B1 | 2/2001 | Leal |
| 6,202,066 B1 | 3/2001 | Barkley et al. |
| 6,216,173 B1 | 4/2001 | Jones et al. |
| 6,219,790 B1 | 4/2001 | Lloyd et al. |
| 6,233,565 B1 | 5/2001 | Lewis et al. |
| 6,256,676 B1 | 7/2001 | Taylor et al. |
| 6,289,322 B1 | 9/2001 | Kitchen et al. |
| 6,317,745 B1 | 11/2001 | Thomas et al. |
| 6,327,578 B1 | 12/2001 | Linehan |
| 6,330,551 B1 | 12/2001 | Ia et al. |
| 6,330,563 B1 | 12/2001 | Heckerman et al. |
| 6,332,163 B1 | 12/2001 | Bowman-Amuah |
| 6,360,211 B1 | 3/2002 | Anderson et al. |
| 6,360,223 B1 | 3/2002 | Ng et al. |
| 6,408,292 B1 | 6/2002 | Bakalash et al. |
| 6,418,416 B1 | 7/2002 | Rosenberg et al. |
| 6,438,527 B1 | 8/2002 | Powar |
| 6,453,352 B1 | 9/2002 | Wagner et al. |
| 6,470,321 B1 | 10/2002 | Cumming et al. |
| 6,490,718 B1 | 12/2002 | Watters |
| 6,519,612 B1 | 2/2003 | Howard et al. |
| 6,523,016 B1 | 2/2003 | Michalski |
| 6,578,015 B1 | 6/2003 | Haseltine et al. |
| 6,594,692 B1 | 7/2003 | Reisman |
| 6,609,114 B1 | 8/2003 | Gressel et al. |
| 6,609,200 B2 | 8/2003 | Anderson et al. |
| 6,622,128 B1 | 9/2003 | Bedell et al. |
| 6,625,597 B1 | 9/2003 | Yazdani |
| 6,629,081 B1 | 9/2003 | Cornelius et al. |
| 6,631,008 B2 | 10/2003 | Aoki |
| 6,640,244 B1 | 10/2003 | Bowman-Amuah |
| 6,675,164 B2 | 1/2004 | Kamath et al. |
| 6,687,693 B2 | 2/2004 | Cereghini et al. |
| 6,694,308 B2 | 2/2004 | Tremblay |
| 6,708,163 B1 | 3/2004 | Kargupta et al. |
| 6,745,229 B1 | 6/2004 | Gobin et al. |
| 6,757,710 B2 | 6/2004 | Reed |
| 6,766,307 B1 | 7/2004 | Israel et al. |
| 6,820,199 B2 | 11/2004 | Wheeler et al. |
| 6,826,542 B1 | 11/2004 | Mrgin et al. |
| 6,850,893 B2 | 2/2005 | Lipkin et al. |
| 6,856,970 B1 | 2/2005 | Campbell et al. |
| 6,868,413 B1 | 3/2005 | Grindrod et al. |
| 6,882,986 B1 | 4/2005 | Heinemann et al. |
| 6,883,004 B2 | 4/2005 | Bahl et al. |

(56) References Cited

U.S. PATENT DOCUMENTS

| | | |
|---|---|---|
| 6,889,325 B1 | 5/2005 | Sipman et al. |
| 6,915,430 B2 | 7/2005 | Wheeler et al. |
| 6,952,737 B1 | 10/2005 | Coates et al. |
| 6,954,632 B2 | 10/2005 | Kobayashi |
| 6,961,849 B1 | 11/2005 | Davis et al. |
| 6,963,843 B1 | 11/2005 | Takatsu et al. |
| 7,003,781 B1 | 2/2006 | Blackwell et al. |
| 7,024,395 B1 | 4/2006 | Mccown et al. |
| 7,039,605 B2 | 5/2006 | Kuwahara et al. |
| 7,068,641 B1 | 6/2006 | Allan et al. |
| 7,085,840 B2 | 8/2006 | De et al. |
| 7,092,941 B1 | 8/2006 | Campos |
| 7,133,845 B1 | 11/2006 | Ginter et al. |
| 7,200,149 B1 | 4/2007 | Hasty, Jr. |
| 7,233,997 B1 | 6/2007 | Leveridge et al. |
| 7,236,957 B2 | 6/2007 | Crosson Smith |
| 7,284,036 B2 | 10/2007 | Ramaswamy |
| 7,308,436 B2 | 12/2007 | Bala et al. |
| 7,502,754 B2 | 3/2009 | Campbell et al. |
| 7,536,435 B2 | 5/2009 | Campbell et al. |
| 7,565,422 B2 | 7/2009 | Campbell et al. |
| 7,568,219 B2 | 7/2009 | Campbell et al. |
| 7,584,277 B2 | 9/2009 | Campbell et al. |
| 7,603,431 B2 | 10/2009 | Campbell et al. |
| 7,624,068 B1 | 11/2009 | Heasley et al. |
| 7,716,590 B1 | 5/2010 | Nathan |
| 7,882,028 B1 | 2/2011 | Devine et al. |
| 8,046,336 B1 | 10/2011 | Zhang et al. |
| 8,108,274 B2 | 1/2012 | Johnston et al. |
| 8,122,490 B2 | 2/2012 | Campbell et al. |
| 8,229,875 B2 | 7/2012 | Roychowdhury |
| 8,229,876 B2 | 7/2012 | Roychowdhury |
| 8,266,115 B1 | 9/2012 | Park et al. |
| 8,317,090 B2 | 11/2012 | Wiesman et al. |
| 8,401,867 B2 | 3/2013 | Lagadec et al. |
| 8,521,646 B2 | 8/2013 | Hoke et al. |
| 8,527,408 B2 | 9/2013 | Campbell et al. |
| 9,003,312 B1 | 4/2015 | Ewe et al. |
| 9,299,241 B1 | 3/2016 | Monical et al. |
| 9,489,627 B2 | 11/2016 | Bala |
| 9,929,988 B2 | 3/2018 | Gil et al. |
| 9,946,995 B2 | 4/2018 | Dwyer et al. |
| 10,142,267 B2 | 11/2018 | Gil et al. |
| 2001/0034675 A1 | 10/2001 | Belford et al. |
| 2001/0051919 A1 | 12/2001 | Mason |
| 2001/0056362 A1 | 12/2001 | Hanagan et al. |
| 2002/0010684 A1 | 1/2002 | Moskowitz |
| 2002/0016769 A1 | 2/2002 | Barbara et al. |
| 2002/0016910 A1 | 2/2002 | Wright et al. |
| 2002/0046335 A1 | 4/2002 | Baum-Waidner |
| 2002/0059113 A1 | 5/2002 | Bahl et al. |
| 2002/0077977 A1 | 6/2002 | Neely et al. |
| 2002/0082990 A1 | 6/2002 | Jones |
| 2002/0107819 A1 | 8/2002 | Ouimet |
| 2002/0111886 A1 | 8/2002 | Chenevich et al. |
| 2002/0124137 A1 | 9/2002 | Ulrich et al. |
| 2002/0135614 A1 | 9/2002 | Bennett |
| 2002/0143699 A1 | 10/2002 | Baumann et al. |
| 2002/0143701 A1 | 10/2002 | Maguire et al. |
| 2002/0169743 A1 | 11/2002 | Arnold et al. |
| 2002/0178117 A1 | 11/2002 | Maguire et al. |
| 2002/0184054 A1 | 12/2002 | Cox et al. |
| 2002/0184123 A1 | 12/2002 | Sijacic et al. |
| 2002/0184349 A1 | 12/2002 | Manukyan |
| 2002/0188619 A1 | 12/2002 | Low |
| 2002/0191311 A1 | 12/2002 | Ulrich et al. |
| 2002/0194159 A1 | 12/2002 | Kamath et al. |
| 2002/0198798 A1 | 12/2002 | Ludwig et al. |
| 2002/0198828 A1 | 12/2002 | Ludwig et al. |
| 2002/0198829 A1 | 12/2002 | Ludwig et al. |
| 2003/0004874 A1 | 1/2003 | Ludwig et al. |
| 2003/0041042 A1 | 2/2003 | Cohen et al. |
| 2003/0046225 A1 | 3/2003 | Yamaguchi et al. |
| 2003/0101446 A1 | 5/2003 | Mcmanus et al. |
| 2003/0110103 A1 | 6/2003 | Sesek et al. |
| 2003/0130921 A1 | 7/2003 | Force et al. |
| 2003/0130942 A1 | 7/2003 | Campbell et al. |
| 2003/0130943 A1 | 7/2003 | Campbell et al. |
| 2003/0130944 A1 | 7/2003 | Force et al. |
| 2003/0130945 A1 | 7/2003 | Force et al. |
| 2003/0167229 A1 | 9/2003 | Ludwig et al. |
| 2003/0184590 A1 | 10/2003 | Will |
| 2003/0191709 A1 | 10/2003 | Elston et al. |
| 2003/0208684 A1 | 11/2003 | Camacho et al. |
| 2003/0217150 A1 | 11/2003 | Roese et al. |
| 2003/0220855 A1 | 11/2003 | Lam et al. |
| 2003/0233305 A1 | 12/2003 | Solomon |
| 2004/0034666 A1 | 2/2004 | Chen |
| 2004/0044603 A1 | 3/2004 | Gordon-Ervin et al. |
| 2004/0064389 A1 | 4/2004 | Force et al. |
| 2004/0230797 A1 | 11/2004 | Ofek et al. |
| 2005/0154692 A1 | 1/2005 | Jacobsen et al. |
| 2005/0108157 A1 | 5/2005 | Bushman et al. |
| 2005/0138110 A1 | 6/2005 | Redlich et al. |
| 2005/0138186 A1 | 6/2005 | Hesselink et al. |
| 2005/0177495 A1 | 8/2005 | Crosson Smith |
| 2005/0177504 A1 | 8/2005 | Crosson Smith |
| 2005/0192896 A1 | 9/2005 | Hutchison et al. |
| 2006/0015822 A1 | 1/2006 | Baig et al. |
| 2006/0031407 A1 | 2/2006 | Dispensa et al. |
| 2006/0059087 A1 | 3/2006 | Smith et al. |
| 2006/0080245 A1 | 4/2006 | Bahl et al. |
| 2006/0089890 A1 | 4/2006 | Campbell |
| 2006/0095372 A1 | 5/2006 | Venkatasubramanian et al. |
| 2006/0101048 A1 | 5/2006 | Mazzagatti et al. |
| 2006/0168023 A1 | 7/2006 | Srinivasan et al. |
| 2006/0190310 A1 | 8/2006 | Gudia et al. |
| 2006/0190380 A1 | 8/2006 | Force et al. |
| 2006/0200767 A1 | 9/2006 | Glaeske et al. |
| 2006/0265662 A1 | 11/2006 | Gertzen |
| 2007/0055672 A1 | 3/2007 | Stevens |
| 2007/0266176 A1 | 11/2007 | Wu |
| 2007/0295803 A1 | 12/2007 | Levine et al. |
| 2008/0104007 A1 | 3/2008 | Bala |
| 2008/0186853 A1 | 8/2008 | Archer et al. |
| 2008/0262919 A1 | 10/2008 | Ang et al. |
| 2009/0083181 A1 | 3/2009 | Bishop et al. |
| 2009/0089194 A1 | 4/2009 | Mathis et al. |
| 2009/0150814 A1 | 6/2009 | Eyer et al. |
| 2009/0271862 A1 | 10/2009 | Allen et al. |
| 2009/0276306 A1 | 11/2009 | Hicks |
| 2009/0307176 A1 | 12/2009 | Jeong et al. |
| 2010/0066540 A1 | 3/2010 | Theobald et al. |
| 2010/0106589 A1 | 4/2010 | Etheredge et al. |
| 2010/0169234 A1 | 7/2010 | Metzger et al. |
| 2010/0211499 A1 | 8/2010 | Zanzot et al. |
| 2010/0274714 A1 | 10/2010 | Sims et al. |
| 2011/0038254 A1 | 2/2011 | Hashiguchi et al. |
| 2011/0302485 A1 | 12/2011 | D'Angelo et al. |
| 2012/0041683 A1 | 2/2012 | Vaske et al. |
| 2012/0054095 A1 | 3/2012 | Lesandro et al. |
| 2012/0078701 A1 | 3/2012 | Woods |
| 2012/0149405 A1 | 6/2012 | Bhat |
| 2012/0150568 A1 | 6/2012 | Greener et al. |
| 2012/0158566 A1 | 6/2012 | Fok et al. |
| 2012/0278898 A1 | 11/2012 | Nguyen et al. |
| 2012/0290379 A1 | 11/2012 | Hoke et al. |
| 2012/0290381 A1 | 11/2012 | Martin et al. |
| 2012/0290382 A1 | 11/2012 | Martin et al. |
| 2012/0290400 A1 | 11/2012 | Hoke et al. |
| 2012/0290471 A1 | 11/2012 | Hoke |
| 2012/0290474 A1 | 11/2012 | Hoke |
| 2012/0290479 A1 | 11/2012 | Hoke et al. |
| 2012/0330805 A1 | 12/2012 | Eberle et al. |
| 2013/0024303 A1 | 1/2013 | Stollery |
| 2013/0071816 A1 | 3/2013 | Singh et al. |
| 2013/0119125 A1 | 5/2013 | Drummond et al. |
| 2013/0144782 A1 | 6/2013 | Eberle et al. |
| 2013/0231974 A1 | 9/2013 | Harris et al. |
| 2013/0311420 A1 | 11/2013 | Tehranchi et al. |
| 2013/0317985 A1 | 11/2013 | Hoke et al. |
| 2013/0346521 A1 | 12/2013 | Arabo et al. |
| 2014/0171135 A1 | 6/2014 | Fan et al. |
| 2014/0241173 A1 | 8/2014 | Knight |

(56) References Cited

U.S. PATENT DOCUMENTS

| | | | |
|---|---|---|---|
| 2014/0241609 A1 | 8/2014 | Vigue et al. | |
| 2014/0244491 A1 | 8/2014 | Eberle et al. | |
| 2014/0258104 A1 | 9/2014 | Harnisch | |
| 2014/0279484 A1 | 9/2014 | Dwyer et al. | |
| 2014/0344046 A1 | 11/2014 | Martin et al. | |
| 2015/0066729 A1* | 3/2015 | Hu | G06Q 40/04 705/37 |
| 2015/0088783 A1* | 3/2015 | Mun | G06Q 40/08 705/36 R |
| 2015/0120536 A1 | 4/2015 | Talker | |
| 2015/0317589 A1 | 11/2015 | Anderson et al. | |
| 2015/0339765 A1* | 11/2015 | Dubey | G06Q 40/00 705/35 |
| 2015/0348067 A1* | 12/2015 | Deegan | G06Q 30/0202 705/7.31 |
| 2017/0178229 A1 | 6/2017 | Koh | |
| 2017/0289106 A1 | 10/2017 | Chen et al. | |
| 2018/0158146 A1* | 6/2018 | Turner | G06Q 40/06 |
| 2020/0242483 A1* | 7/2020 | Shashikant Rao | G06N 5/022 |
| 2020/0279198 A1* | 9/2020 | Turner | G06Q 40/02 |
| 2020/0349639 A1 | 11/2020 | Mousseau | |
| 2020/0366754 A1 | 11/2020 | Wang et al. | |
| 2020/0410410 A1* | 12/2020 | Tripathi | G06Q 40/12 |
| 2021/0142399 A1 | 5/2021 | Joliveau | |

FOREIGN PATENT DOCUMENTS

| | | | |
|---|---|---|---|
| WO | 98/58339 | A1 | 12/1998 |
| WO | 99/28843 | A2 | 6/1999 |
| WO | 00/46725 | A1 | 8/2000 |
| WO | 01/41020 | A1 | 6/2001 |
| WO | 2014/111540 | A1 | 7/2014 |
| WO | 2017/027900 | A1 | 2/2017 |

OTHER PUBLICATIONS

Academic Press Dictionary of Science and Technology (1992), retrieved from xreferplus.com, defining data structure.

Academic Press Dictionary of Science and Technology (1992), retrieved from xreferplus.com, defining parameter.

An Overview of Electronic Bill Presentment and Payment Operatin Models, prepared by the Business Practices Task Force of NACHA's Council for Electronic Billing and Payment, Apr. 9, 1999, pp. 1-12.

Broadridge Communications Cloud for Retail Banks, Broadridge, webpage downloaded from https://www.broadridge.com/resource/broadridge-communications-cloud-for-retail-banks on Feb. 21, 2020.

Dictionary of multimedia and Internet Applications (1999), retrieved from xreferplus.com, defining Relational Database.

GTFrame, Business Flows Integration, Bottomline Technologies (de), Inc, 2015.

Helping information move with money, identitii, web page downloaded on Mar. 20, 2020 from https://identitii.com/.

ISO 20022 Migration and Modernization, Volante, web page downloaded on Mar. 20, 2020 from https://www.volantetech.com/iso-20022-migration.

ISO 20022: Helping banks with transformation through faster onboarding and more accurate testing, XMLdation, web page download on Mar. 20, 2020 from https://www.xmldation.com/en/2017/iso-20022/.

Key Decisions Required When Utilizing a SWIFT Service Bureau, Bottomline Technologies (de), Inc, 2015.

Knudson, Scott E.; Walton, Jack K., III; Young, Florence M.; Business-to Business Payments and the Role of Financial Electronic Data Interchange, Federal Reserve Bulletin, Apr. 1994, pp. 269-278.

Masich, Jeffrey L., Improving Cash Flow and Streamlining Operations Through EDI, Journal of Cash Management, Jan./Feb. 1991, pp. 13-16.

Message Transformation, AnaSys, a PDF document found at https://www.anasys.com/wp-content/uploads/2017/03/Message-Transformation-EN-for-Banks-and-Corporates.pdf on Feb. 21, 2020.

Mooney, James E., Getting Started in EDI: Chevron's approach, Journal of Cash Mangement, NCC MA Conference 1991, pp. 69-74.

Mosele Lonnie E.; Boodey, David M., Mastering Microsoft Office 97, Professional Edition, Second Edition, 1997, pp. 1123/1124.

Patil et al., "Out of Order Floating Point Coprocessor for RISC V ISA", 2015, Centre for Development of Advanced Computing, Bangalore, INDIA (Year: 2015).

Penguin International Dictionary of Finance (1999), retrieved from xreferplus.com, defining on-line.

Roget's II: The New Thesaurus (1995), retrieved from xreferplus.com, defining invoice and fee.

Secure File Transfer While You Sleep—No Longer Just a Dream; New VanDyke Release Makes Unattended Secure File Transfers a Reality, PR Newswire New York: Dec. 20, 2001. p. 1.

Sterci rebrands service bureau as GT Cloud, Sterci, May 22, 2013.

SWIFT for Corporates:Making the Business Case, Bottomline Technologies (de), Inc., 2014.

Treleaven, et al., Computational Finance, published in IEEE Computer (vol. 43, Issue: 12, Dec. 2010), entire document pertinent (Year: 2010).

TurboTax for Windows User's Guide (1997).

"Distributed Mining of Classification Rules", By Cho and Wuthrich, 2002 http://www.springerlink.com/(21nnasudlakyzciv54i5kxz0)/app/home/contribution.asp?referrer=parent&backto=issue,1,6;journal,2,3,31;linkingpublicationresults,1:105441,1.

Bansal, Nikhil, Avrim Blum, and Shuchi Chawla. "Correlation clustering." Machine Learning 56.1-3 (2004): 89-113.

Finley, Thomas, and Thorsten Joachims. "Supervised clustering with support vector machines." Proceedings of the 22nd international conference on Machine learning, ACM, 2005.

Meia et al., Comparing clusterings—an information based distance, Journal of Multivariate Analysis 98 (2007) 873-895.

Jhingran, Anant, "Moving toward outcome-based intelligence", IDG Contributor Network, Mar. 19, 2018.

Wikipedia, "Autoregressive integrated moving average", Oct. 7, 2019, webpage downloaded from https://en.wikipedia.org/wiki/Autoregressive_integrated_moving_average on Nov. 7, 2019.

IGTB, "iGTB Finovate 2019 Demo of CBX", YouTube video, Feb. 27, 2019, video located at https://www.youtube.com/watch?v=U0_r74N51nc.

Intellect Design Arena, "Trus Contextual Banking Experience Delivered", YouTube video, Oct. 13, 2017, video located at https://www.youtube.com/watch?v=CAQSqmNhDEA.

Joliveau, Edouard, "Payment & Cash Management 4.2: Solution Description", Bottomline Technologies, Mar. 29, 2018.

Madura, "International Financial Management", Abridged 8/e, Chapter 21, Mason, OH:Thompson South-Western, 2007.

Finastra, "Fusion Cash Management: Cash Flow Forecasting Module", Mar. 2018.

C3 CRM, "Next Generation CRM Designed for AI/Machine Learning", webpage found at https://c3.ai/products/c3-crm/ on Oct. 21, 2019.

* cited by examiner

| ID 801 | BANK 802 | | CREDIT AGENCY 803 | | REGISTRY OF DEEDS 804 | |
|---|---|---|---|---|---|---|
| SSN | Loan Amount Borrowed | Default | Credit Score | Total Debt | Home Ownership | Home Value |
| 012-34-5678 | $ 10,000 | − | 575 | $ 500,000 | Y | $ 650,000 |
| 012-34-5679 | $ 12,000 | + | 829 | $ - | Y | $ 750,000 |
| 012-34-5670 | $ 15,000 | − | 700 | $ 30,000 | N | $ 50,000 |
| 012-34-5671 | $ 11,000 | − | 600 | $ 400,000 | Y | $ 350,000 |
| 012-34-5672 | $ 27,000 | + | 625 | $ 30,000 | N | $ - |
| 012-34-5673 | $ 9,000 | + | 715 | $ 900,000 | Y | $ 1,250,000 |
| 012-34-5674 | $ 13,000 | + | 735 | $ 125,000 | Y | $ 500,000 |
| 012-34-5675 | $ 15,000 | + | 800 | $ 10,000 | N | $ - |
| 012-34-5676 | $ 25,000 | + | 690 | $ 295,000 | Y | $ 400,000 |
| 012-34-5677 | $ 33,000 | + | 825 | $ 85,000 | Y | $ 275,000 |

*Figure 15*

| Feature Data Manager 1202 | Feature Data Set 1203 | Event Number 1204 | Unsupervised Event Junction 1201 | | | | | |
|---|---|---|---|---|---|---|---|---|
| | | | <name> 1206 | <name> | | <name> 1207 | <name> | |
| | | | Join Feature Attribute Values 1205 | | | | | |
| | | 0 | <value> | <value> | | <value> | <value> | |
| | | 1 | <value> | <value> | | <value> | <value> | |
| | | ⋮ | ⋮ | ⋮ | | ⋮ | ⋮ | ⋮ |

*Figure 19*

CASH FLOW FORECASTING USING A BOTTOMS-UP MACHINE LEARNING APPROACH

PRIOR APPLICATION

This application is a continuation-in-part patent application of U.S. patent application Ser. No. 16/680,652, "International cash management software using machine learning", by inventor Edouard Joliveau, filed on Nov. 12, 2019, incorporated herein by reference.

BACKGROUND

Technical Field

The system, apparatuses, and methods described herein generally relate to cash management software, and, in particular, to using machine learning to improve cash flow forecasting.

Description of the Related Art

The term cash management is used to describe the optimization of cash flows and investment of excess cash. From an international perspective, cash management is very complex because laws pertaining to cross border cash transfers differ amount countries. In addition, exchange rate fluctuations can affect the value of cross-boarder cash transfers. Financial software needs to understand the advantages and disadvantages of investing cash in foreign markets so that it can make international cash management decisions to maximize corporate value.

For a multinational corporation, revenues and expenses occur in multiple countries and currencies. By optimizing cash locations and borrowing or investing, significant value can be created solely within the corporate treasury function. While cash management is a complex in a single entity operating in a single currency, in a multinational corporation with multiple subsidiaries, cash management is a vastly complex operation requiring complex software systems that are networked with multiple banks in multiple locations around the world, each with multiple accounts.

International cash management software must quickly identify incoming cash and accelerate cash inflows, since the more quickly the inflows are received and identified, the more quickly they can be invested or used to pay obligations. The currency and location of the inflows are also important.

Payments are a second aspect of the cash management software, understanding the obligations and the timings of these payments. Once again, where the payment comes from, which country, which bank, which account, and which currency are all important factors for the software to consider.

Another technique for optimizing cash flow movements, netting, can be implemented by the centralized cash management software. This technique optimizes cash flows by reducing the administrative and transaction costs that result from currency conversion. First, netting reduces the number of cross-border transactions between subsidiaries, thereby reducing the overall administrative cost of such cash transfers. Second, it reduces the need for foreign exchange conversion since transactions occur less frequently, thereby reducing the transaction costs associated with foreign exchange conversion. Third, cash flow forecasting is easier since only net cash transfers are made at the end of each period, rather than individual cash transfers throughout the period. Improved cash flow forecasting can enhance financing and investment decisions.

A multilateral netting system usually involves a more complex interchange among the parent and several subsidiaries. For most large multinational corporations, a multilateral netting system would be necessary to effectively reduce administrative and currency conversion costs. Such a system is normally centralized so that all necessary information is consolidated. From the consolidated cash flow information, net cash flow positions for each pair of units (subsidiaries, or whatever) are determined, and the actual reconciliation at the end of each period can be dictated. The centralized group may even maintain inventories of various currencies so that currency conversions for the end-of-period net payments can be completed without significant transaction costs.

Laws related to netting and local government blockage of fund transfers also add to the complexity of international cash management.

Many multinational corporations have at least $100 million in cash balances across banks in various countries. If they can find a way to earn an extra 1 percent on those funds, they will generate an extra $1 million each year on cash balances of $100 million. Thus, their short-term investment decision affects the amount of their cash inflows. Their excess funds can be invested in domestic or foreign short-term securities. In some periods, foreign short-term securities will have higher interest rates than domestic interest rates.

Centralized cash management is more complicated when the corporation uses multiple currencies. All excess funds could be pooled and converted to a single currency for investment purposes. However, the advantage of pooling may be offset by the transaction costs incurred when converting to a single currency.

Centralized cash management is also valuable. The short-term cash available among subsidiaries can be pooled together so that there is a separate pool for each currency. Then excess cash in a particular currency can still be used to satisfy other subsidiary deficiencies in that currency. In this way, funds can be transferred from one subsidiary to another without incurring transaction costs that banks charge for exchanging currencies. This strategy is especially feasible when all subsidiary funds are deposited in branches of a single bank so that the funds can easily be transferred among subsidiaries.

Another possible function of centralized cash management is to invest funds in securities denominated in the foreign currencies that will be needed by the subsidiaries in the future. Corporations can use excess cash to invest cash in international money market instruments so that they can cover any payables positions in specific foreign currencies. If they have payables in foreign currencies that are expected to appreciate, they can cover such positions by creating short-term deposits in those currencies. The maturity of a deposit would ideally coincide with the date at which the funds are needed. By integrating with the payments software, the treasury software knows when cash outflows will occur.

International cash management requires timely information across subsidiaries regarding each subsidiary's cash positions in each currency, along with interest rate information about each currency. A centralized cash management software system needs a continual flow of information about currency positions so that it can determine whether one subsidiary's shortage of cash can be covered by another subsidiary's excess cash in that currency. Given the major improvements in online technology in recent years, all multinational corporations can easily and efficiently create a multinational communications network among their subsidiaries to ensure that information about cash positions is continually updated.

The Payment & Cash Management (PCM) 110 solution provides corporate clients with a single centralized solution for all banking relationships that is secure, smart, and compliant. PCM reduces complexity, cost, and risks implied by the use of multiple channels and connectivity to retrieve cash positions from diverse bank accounts.

The modules seen in FIG. 1 effectively create a multi banking platform 110 independent of various bank 121-126 relationships, with configurable workflow allowing both simple straight-through processing or approval patterns designed around business requirements. Resulting payments are seamlessly generated behind the scenes through a list of supported payment mechanisms such as BACS, Faster Payments (Direct Corporate Access), and the SWIFT Gateway. Additional connectivity is achieved with an H2H or an API connection with dedicated banks 121-126.

PCM 110 assists clients manage their short-term cash position by centralizing bank account balances and transaction data in one place, PCM 110 provides an accurate picture of cash liquidity regardless of bank, currency, geography, head office, or subsidiary and also enables cash forecasting.

In its most basic version, PCM 110 can be used as a multi-network payment gateway using the BT Universal Aggregator 120. In addition, format validation and sanction screening capabilities can be enabled.

On top of the multi-network gateway, PCM 110 can enable a Statements Manager 112 module which brings added-value features to the inbound workflow, taking advantage of the data coming from the banks 121-126 (i.e. bank statement and confirmations).

On top of the multi-network gateway, PCM 110 can enable a Payments Manager 111 module which brings added-value capabilities to the outbound workflow. This payment manager 111 module can be coupled with a sanction screening 116 module. The sanction screening 116 module may use artificial intelligence to create and compare a profile of the transaction to profiles of sanctioned entities and block the transactions that match a sanctioned entity.

When already combining the payment 111 and statement manager 112, a Cash Manager 115 can be enabled to bring cash management added-value features.

All of this analysis and planning is extremely complex and operates best with a context of the history of payments and receipts in various currencies. To manage the complexities, a machinelearning-based solution can greatly improve other solutions. Machine learning provides consistency and the ability to manage large training datasets to determine the optimal models for accurate forecasting.

Machine learning and artificial intelligence algorithms allow the processing of a large data set of various features, and process that learning data set through one of a number of learning algorithms to create a rule set based on the data. This rule set can reliably predict what will occur for a given event. For instance, in a cash management application, with a given event (set of attributes, i.e. payments and receipts), the algorithm can determine the likely cash needs.

Machine learning is a method of analyzing information using algorithms and statistical models to find trends and patterns. In a machine learning solution, statistical models are created, or trained using historical data. During this process, a sample set of data is loaded into the machine learning solution. The solution then finds relationships in the training data. As a result, an algorithm is developed that can be used to make predictions about the future. Next, the algorithm goes through a tuning process. The tuning process determines how an algorithm behaves in order to deliver the best possible analysis. Typically, several versions or iterations of a model are created in order to identify the model that delivers the most accurate outcomes.

Generally, models are used to either make predictions about the future based on past data or discover patterns in existing data. When making predictions about the future, models are used to analyze a specific property or characteristic. In machine learning, these properties or characteristics are known as features. A feature is similar to a column in a spreadsheet. When discovering patterns, a model could be used to identify data that is outside of the norm. For example, in a data set containing payments sent from a corporation, a model could be used to predict future payments in various currencies.

Once a model is trained and tuned, it is published or deployed to a production or QA environment. In this environment, data is often sent from another application in real-time to the machine learning solution. The machine learning solution then analyzes the new data, compares it to the statistical model, and makes predictions and observations. This information is then sent back to the originating application. The application can use the information to perform a variety of functions, such as alerting a user to perform an action, displaying data that falls outside of a norm, or prompting a user to verify that data was properly characterized. The model learns from each intervention and becomes more efficient and precise as it recognizes patterns and discovers anomalies.

An effective machine learning engine can automate the development of machine learning models, greatly reducing the amount of time spent reviewing cash balances, calling attention to the most important items, and maximizing performance based on real-world feedback.

As treasury software has become more complex, especially in attempting to manage cash positions across multiple subsidiaries and currencies, a need has arisen to improve the cash management software with machine learning functionality so that cash inflow and outflow patterns can be analyzed to optimize the cash balances across currencies. Machine learning requires the specialized computing devices described in FIG. 5 to reliably, accurately, and practically perform the computations required to build and execute the machine learning models. The present set of inventions addresses this need.

BRIEF SUMMARY OF THE INVENTIONS

An improved cash management apparatus is described herein. The apparatus is made up of one or more payment rails connected to one or more banks, a special purpose server connected to the one or more payment rails, and a plurality of data storage facilities connected to the special purpose server. The special-purpose server is configured to retrieve a set of payment and receipt transactions from the plurality of data storage facilities for a given past date range. It is also configured to separate the set of payment and receipt transactions by ledger accounts. The special-purpose server is further configured to sort the payment and receipt transactions with proximate time frames and configured to perform an ARIMA analysis on the payment and receipt transactions in each ledger account of each currency account to create a model of expected inflow and outflows for each period for each ledger account for each currency account. The special-purpose server is also configured to forecast receipts and payments for a future period, where the special-purpose server subtracts the forecast of the payments from the forecast of the receipts and adds in a previous period cash balance to create a forecast cash balance time series for each currency account.

In some cases, the set of payment and receipt transactions further includes transactions from multiple tenants from a bank, and the future period could be user-configurable. The forecast of the payments and/or receipts could be modified to incorporate actual planned payments.

The special-purpose server could be configured to retrieve historical banking rate information and perform the ARIMA analysis on the historical banking rate information to create a forecast banking rate information time series. The special-purpose server could be configured to execute an algorithm on the forecast cash balance time series for each currency account and on the forecast banking rate information time series to determine a set of optimal cash transfers between each currency account and one or more sweep accounts, and then the special-purpose server could execute instructions to make payments and cash transfers.

The algorithm could be a machine learning algorithm, such as K-means or DensiCube. The bank rate information could be retrieved from the one or more banks over the one or more payment rails. The bank rate information could include interest rates, foreign exchange rates, and money transfer costs.

A method for managing cash in an organization is also described here. The method is made up of (1) retrieving a set of payment and receipt transactions from a plurality of data storage facilities for a given past date range for a plurality of currency accounts with a special-purpose server that is connected to the plurality of data storage facilities; (2) separating the set of the payment and receipt transactions by ledger accounts; (3) sorting the set of the payment and receipt transactions with proximate time frames; (4) performing an ARIMA analysis in on the set of payment and receipt transactions in each ledger account of each currency account; (5) creating a model of expected inflows and outflows for each period for each ledger account for each currency account; (6) forecasting receipts payments for a future period; and (7) subtracting, with the special purpose server, the forecast of the payments from the forecast of the receipts and adding in a previous day cash balance, creating a forecast cash balance time series for each currency account.

The method could also include (8) retrieving historical banking rate information to the special-purpose server; (9) performing the ARIMA analysis on the historical banking rate information to create a forecast banking rate information time series; (10) executing, using the special purpose server, an algorithm on the forecast cash balance time series for each currency account and the forecast banking rate information time series to determine a set of optimal cash transfers between each currency account and one or more sweep accounts; and (11) executing, by the special purpose server, instructions to make payments and cash transfers.

BRIEF DESCRIPTION OF THE DRAWINGS

FIG. 15 is a view of a database distributed over three servers.

FIG. 19 is an overview of the distributed data structure upon which the distributed machine learning algorithm is performed.

DETAILED DESCRIPTION

Figure 1:
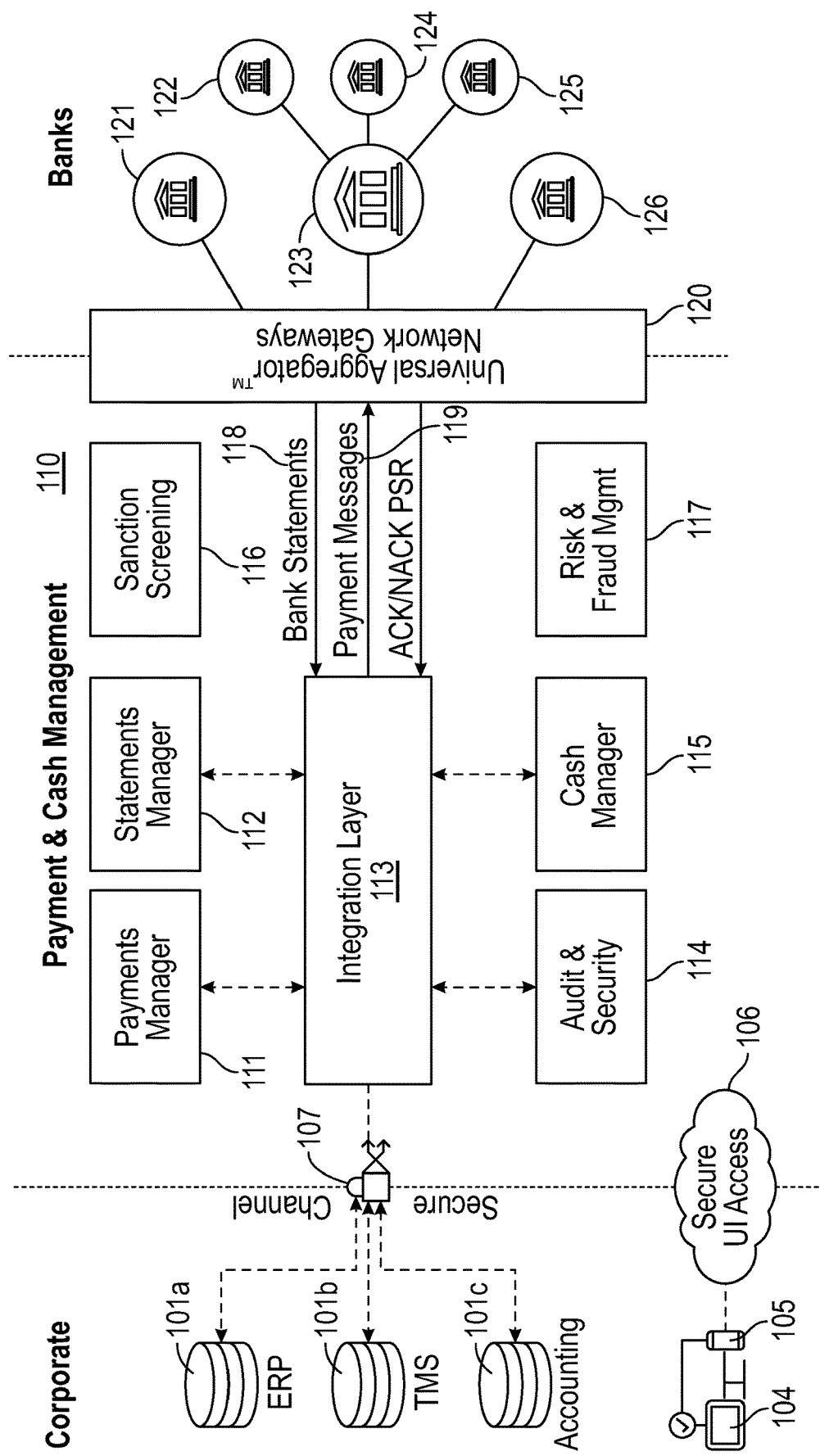
FIG. 1 is a block diagram of a payment and cash management system.

The present inventions are now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Beginning with FIG. 1, the corporate data is pulled from the ERP 101*a* system (enterprise resource planning), the TMS 101*b* system (transportation management system), and the accounting 101*c* systems through a secure channel 107 to the PCM 110. In addition, users using a personal computing device such as a personal computer 104, a smartphone 105, a tablet, a laptop, a smartwatch, or similar device through a secure network access 106 can configure, manage, observe, and operate the PCM 110. The secure network access 106 communicates through the secure channel 107 to provide the computing devices 104, 105 with access to the PCM 110 modules.

The secure channel 107 interfaces with the integration layer 113 of the PCM 110. This channel 107 provides access between the corporate facilities, through the integration layer 113, to the payments manager 111, the statements manager 112, the audit and security 114 module, and the cash manager 115.

On the other side of the PCM 110, the integration layer 113 interfaces with the universal aggregator network gateway 120. The universal aggregator 120 provides access to a number of banks 121-126 using a number of different protocols (SWIFT, ACH, RTP, BACS, etc.) and networks (payment rails 504).

The messages between the universal aggregator 120 and the integration layer 113 are made up of bank statements 118, account balances, interest rates, costs for wire transfers, and foreign exchange rates coming into the PCM 110. The integration layer 113 sends payment messages 119, as well as messages to transfer funds, loan funds, and borrow funds. In addition, message acknowledgements and other housekeeping information are exchanged.

The universal aggregator 120 sends and receives information from the banks 121-126 through the various payment rails 504. A payment rail 504 is a secure network that moves transactions between banks, where the transactions are related to the electronic movement of money from payer to payee.

The payment manager module 111 provides full visibility on the payments lifecycle from input (import or manual creation) to confirmation by the bank. PCM 110 allows importing transaction files from ERP 101a, TMS 101b, DBMS 101c, or any other backend application through a secure channel 107. The payments manager 111 then validates the payment, and gathers approvals through an approval workflow, and prepares the payment for sending to the bank rails. However, before the payment is released, the payments go to the cash manager 115 to assure that funding is available.

The security model 114 enables the granular control of entitlements or access rights allowing access to be controlled based on functionality and data. The user will only see the functionality and data to which he has been granted access.

The statement manager module 112 gives clients the ability to control and monitor proper receipt of statements, and link these to account and business units in static data. PCM module 110 will import all data contained into the bank statement (End of Day and Intraday) which allows clients to control balances and transactions. Statements from partner banks are displayed in exactly the same way, regardless of bank, country, currency, or format.

PCM 110 can interface with a Sanction Screening module 116. This module 116 will check transactions against sanction lists maintained by various government entities that prohibit transactions with sanctioned entities. Transaction sanction screening 116 is performed after authorization and before sending the transaction over a network. Similarly, the risk and fraud management module 117 checks transactions for fraud by performing various analytics to prevent fraudulent payments.

Figure 2:
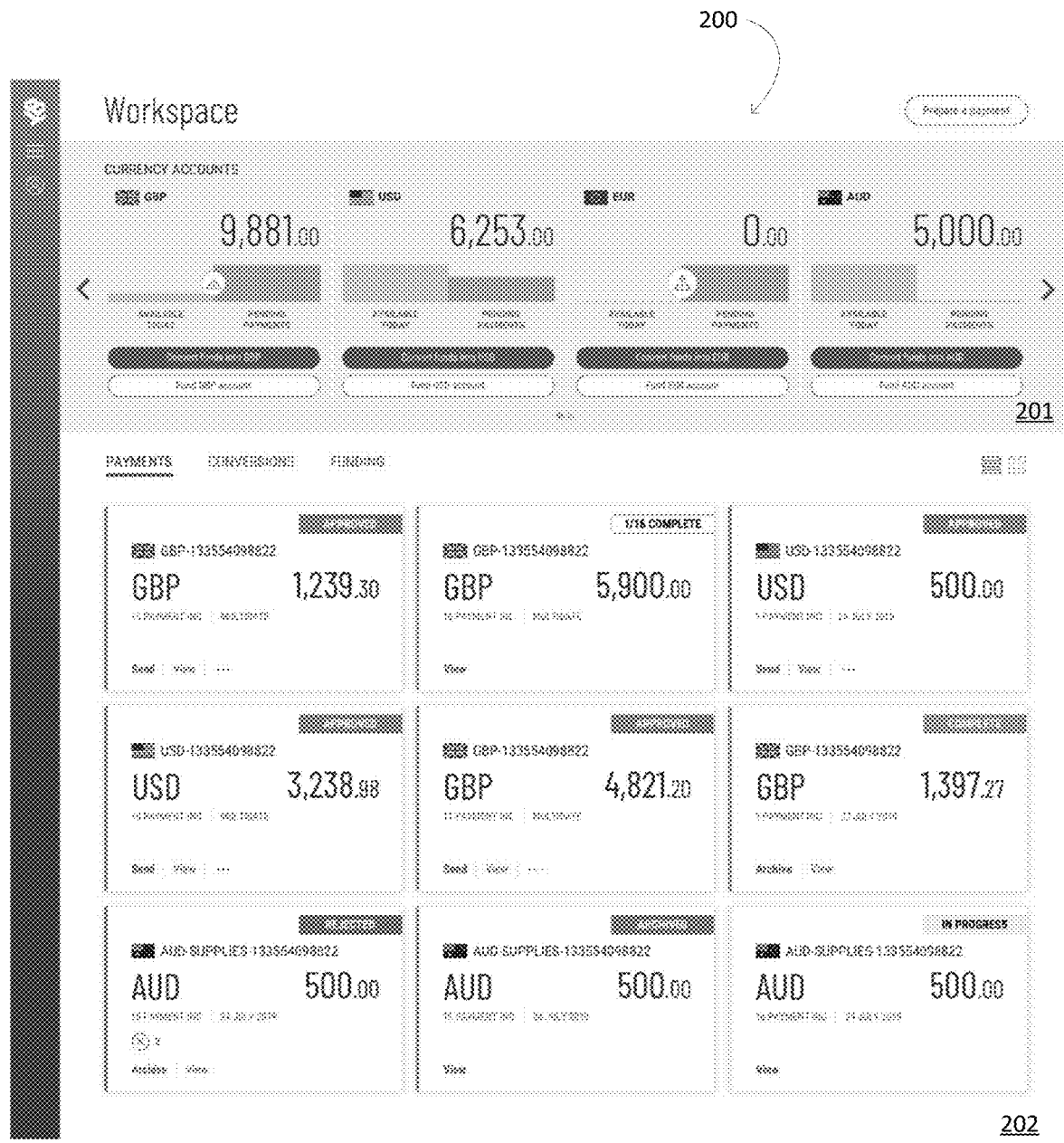
FIG. 2 is a sample screen showing four currency accounts and a group of payments.

The PCM 110 cash manager 115 incorporates functions for managing liquidity 301, cash forecasting 302, and cash pooling 303. See FIG. 2 for a sample screen 200 of the cash management function. The tiles on the bottom of the screen show the payments 202 that are pending. Each payment tile has a flag indicating the country where the payment is to be made along with an indication of the currency (USD, GBP, EURO, AUD, etc.) and the account number. The amount of the currency is shown on the tile, as well as the number of payments included and the date when the payment is due. The status of the payment is also included in the tile (APPROVED, PAID, COMPLETE, REJECTED, ARCHIVED, CANCELLED, ERROR, IN PROGRESS, etc).

The top of the screen shows the balances of each currency account 201. Each tile shows one currency, the account balance in that currency, and a chart showing the amount available for payment and the pending payments. A warning triangle is shown when the payments exceed the balance in that currency. The user is given the option to convert funds into the currency or to directly fund the account.

Figure 3:
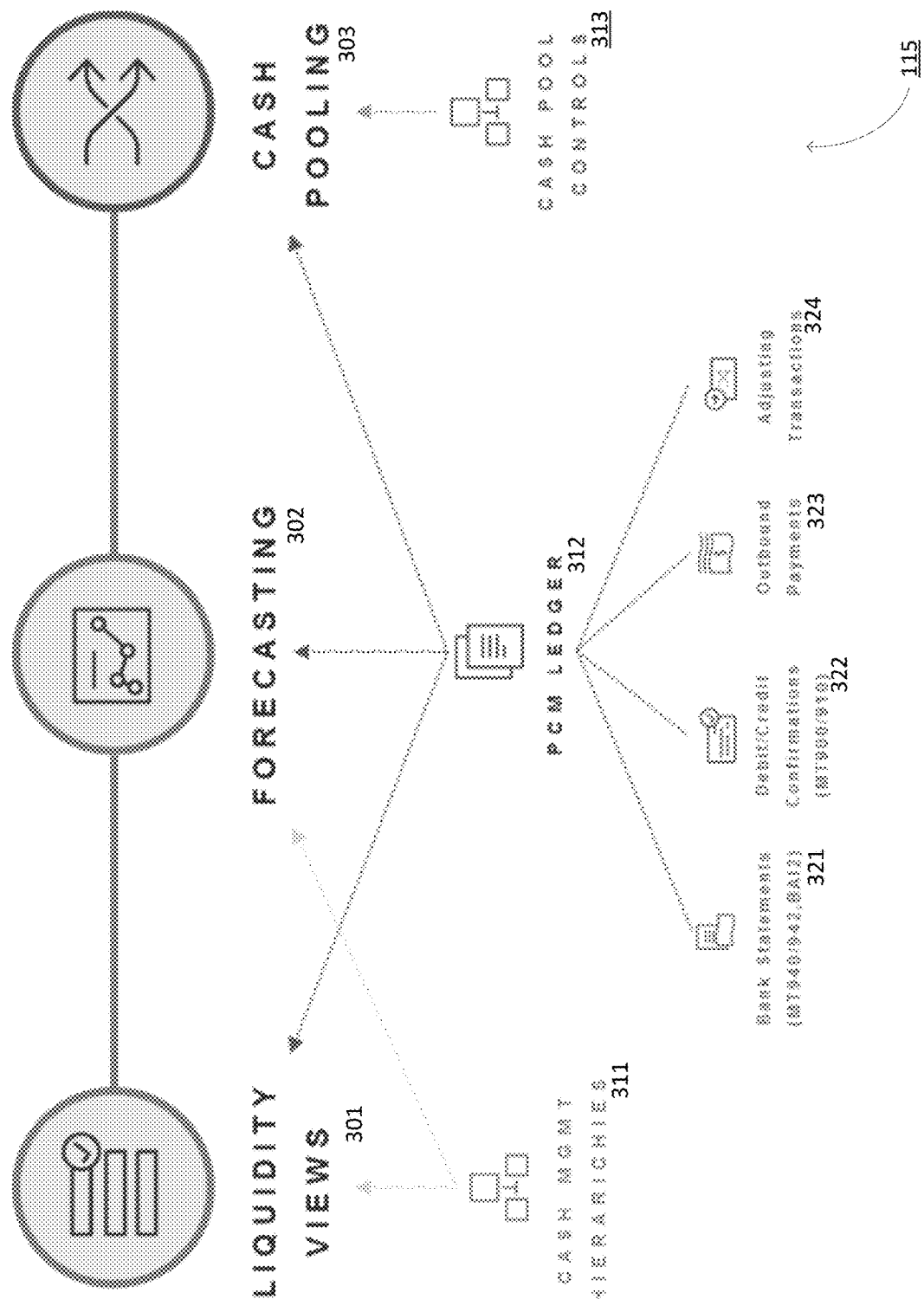
FIG. 3 is a diagram of the various functions of the cash management system.

The PCM 110 in FIG. 3 uses current bank account balances and high-value cash transaction information to facilitate cash management. The Cash Manager module 115 comprises a consolidated view of accounts, short term cash forecast, and the capability of generating cash transfers between accounts. The consolidated view of all bank accounts 200, the 'liquidity view' 301, provides users with a hierarchically organized view of the current and available funds balance across all accounts.

Users can configure hierarchical groups of accounts 311 for cash management purposes. A typical hierarchy consists of a lead account, with subsidiary accounts in the same currency. Multiple account hierarchies may be defined, and these hierarchies can then be used by the Liquidity View 301 and Cash Forecasts 302. New account hierarchies can be defined for Cash Pooling 303 purposes.

Transactions, either passing through the payments process or captured directly (in the case of expected receipts) from back-office systems are brought into the consolidated cash ledger 312. Here they are matched against confirmation messages, interim statements, and bank statements in order to identify the current "open" transactions yet to be reported on a bank statement.

For accounts that are being actively managed through the PCM User Interface, daily Bank Statements 321 are loaded through the file interface automatically with a batch. These bank statements 321 are used to provide a closing position for the previous day. Additional information is derived from the debit and credit confirmations 322, the outboard payments 323, and the adjusting transactions 324. The closing balance acts as the opening balance for the current position. The bank statement is also reconciled against the current "open" transactions for the day and matching transactions are closed.

By combining and matching your organization's transactions and your partner bank transactions, PCM can create an accurate representation of the short-term cash forecast. The integration, statement processing, and transaction matching processes are automated background tasks and require no user intervention. The short-term cash forecast module displays the current balance+/−pending payments, transfers, and expected receipts for the coming days.

PCM Forecasting 302 features include the creation and administration of user's hierarchical cash forecasting structures that are bank independent, standard cash forecasts based on a 5-day liquidity forecast, drill-down capability to display forecasted transactions against individual accounts, the addition of single or repetitive manual adjustments to cash forecast (for repetitive adjustments, a background process—scheduled on the daily run list, will automatically add the recurring adjustment to the cash forecast), conversion of account balances into account hierarchy currency (uses the exchange rates, stored as static reference data to estimate the conversion between currencies), visual indicators against each account to show if the expected statements or confirmations have been received.

Ledger 312 adjustment can be made directly in PCM 110 to reflect business scenarios outside of the system. Standard adjustment details can be added (account, amount, date, repeat option, and start day of the month). Users can also search on ledger adjustments, view details of individual ledger adjustments, and export the results in the same manner as for payments.

In conjunction with the short-term liquidity forecast 302, the liquidity management functionality may be enabled to provide visibility of cash positions as it displays the current and available funds balance across all accounts in the selected account hierarchy. The liquidity management features include the creation and administration of user's own hierarchical cash reporting structures that are bank independent, drill-down capability to display statement lines against each account along with intraday transactions, closed balance display and available funds display, and conversion of account balances into account hierarchy currency (uses the exchange rates, stored as static reference data to estimate the conversion between currencies).

The cash management 115 can be used to implement cash pooling 303 both across a group or locally as required. Cash pool views can be created from a cash account hierarchy 311. To control the sweeping and funding process, the following parameters can be defined for each account in the cash pool: transfer action (sweep and funds, fund only, report only), minimum transfer, rounding, minimum balance, and target balance. Cash pool controls 313 define the operating rules of the cash pooling 303.

In addition, the cash manager 115 provides the functionality of automatically funding the cash positions in various currencies and in various accounts (or it could provide suggestions to a human cash manager). This feature interprets the current cash forecast, and the parameters set up for the accounts in the cash pool and implements transactions to sweep surplus cash into the lead account for the group or fund subsidiary accounts from the lead account in the group. This operation is repeated for each level in the account hierarchy. The transfers will be executed automatically (or created for authorization). Cross-currency cash pools can be configured, and these will use the exchange rates, stored as static reference data to estimate conversions between currencies.

Figure 4:
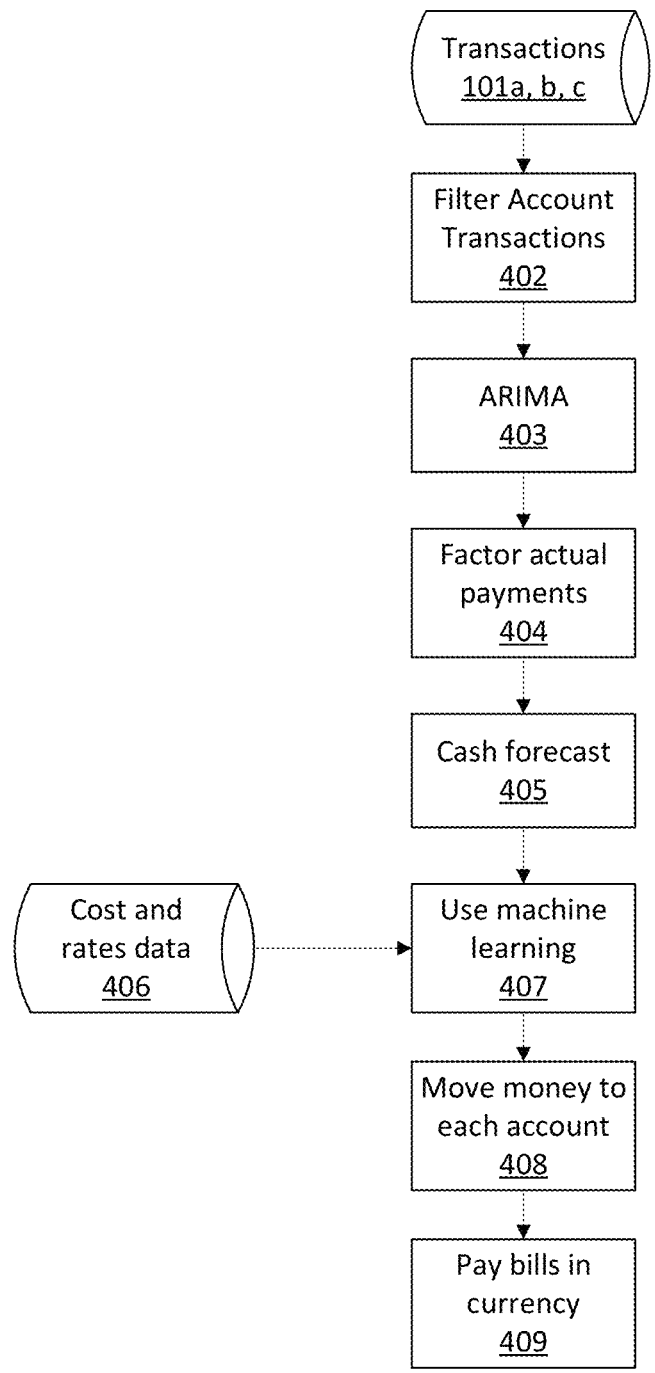
FIG. 4 is a flow hart of the periodic process to pay bills.
Figure 6:
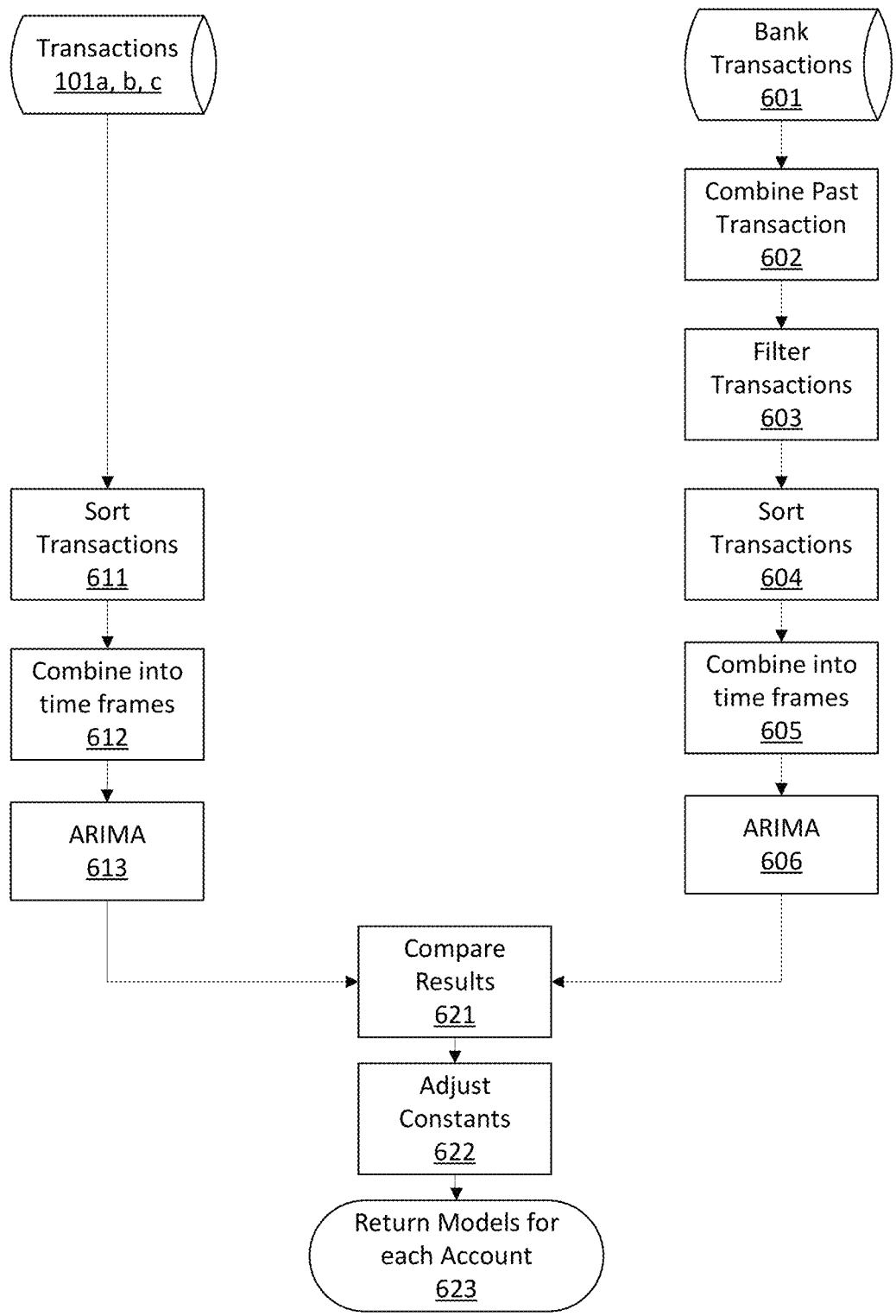
FIG. 6 is an alternative embodiment of the creation of models for predicting cash balances.

FIG. 4 shows a flow chart of the machine learning required to automatically determine the appropriate funding in each currency and in each account. First of all, the historical transactions of the business are pulled from the accounting 101c, TMS 101b and ERP 101a systems, filtering 402 these transactions to isolate the receipts and the payments within a review period. This review period is the amount of time, perhaps a month, a quarter, a year, or a decade. The review period should be sufficiently long to generate a large number of receipts and payments, enough to create statistically significant data. In addition, the review period should be long enough to cover several seasonal periods. For some businesses, a season could be a month, for others, it is a year. In some embodiments, the review period is determined by a machine learning algorithm testing the quality of the resulting data over a variety of period values and choosing the best value for the available data. FIG. 6 describes an alternative methodology for filtering the account transactions 402 and the ARIMA 403 steps.

Next, an autoregressive integrated moving average (ARIMA) 403 is run against the data. An autoregressive integrated moving average (ARIMA) model is a generalization of an autoregressive moving average (ARMA) model. Both of these models are fitted to time series data either to better understand the data or to predict future points in the series (forecasting). ARIMA models are applied in some cases where data show evidence of non-stationarity, where an initial differencing step (corresponding to the "integrated" part of the model) can be applied one or more times to eliminate the non-stationarity. The ARIMA model is considered a machine learning technique within the field of artificial intelligence technology.

In some embodiments, the ARIMA model is run, and then all outliers beyond one or two standard deviations, are removed from the dataset, and the data run again. Particularly with receipts and payments, occasionally a very large payment for a large job or a past due client suddenly pays up. This may throw off the predictive values and are best removed from the data unless there is reason to know that this is a periodic event.

Given a time series of data $X_t$ where t is an integer index and the $X_t$ are real numbers, an ARIMA (p, d, q) model is given by $$\left(1 - \sum_{i=1}^{p} \alpha_i L^i\right)(1 - L)^d X_t = \left(1 - \sum_{i=1}^{q} \theta_i L^i\right)\varepsilon_t$$

where L is the lag operator, the $\alpha_i$ are the parameters of the autoregressive part of the model, the $\theta_i$ are the parameters of the moving average part and the $\varepsilon_t$ are error terms. The error terms $\varepsilon_t$ are generally assumed to be independent, identically distributed variables sampled from a normal distribution with zero mean. The parameter p is the order (number of time lags) of the autoregressive model, d is the degree of differencing (the number of times the data have had past values subtracted), and q is the order of the moving-average model.

The ARIMA model 403 is run on the receipts and payments separately for each currency and each account, with each predicting the receipts and payments for each currency-account group. The ARIMA model 403 provides the time series $X_t$ for receipts and payments for each currency-account for the next 15 or 30 days. Treasury function in-flows or out-flows (funding loans or transfers or investments) are not included in this calculation.

Since payments are typically paid 30 or so days after receipt, and the approval process takes 7-14 days, so the PCM 110 knows perhaps 15 days' worth of actual payments (other periods could be used for other embodiments). These actual payments 404 are factored into the future payments time series. In some cases, several days' worth of receipts may also be known in advance, depending on the characteristics of the bank account and payment rails. If known in advance, the receipts are also switched to actual values. See FIG. 7 for an alternative method of determining the cash forecast 405 and incorporating the actuals 404.

Once the time series $X_i$ for receipts and the time series $X_i$ for payments are determined, the running balance is calculated by taking the previous balance in the currency account and subtracting the payments $X_i$ for the day and adding the receipts $X_i$ for the day to obtain the account balance for the end of the day (cash forecast 405). A fifteen-day forecast should be fine, but other durations could be used without deviating from these inventions. In some embodiments, this number is configurable. The results of the calculations are assembled into a cash flow time series for the future $X_i$.

Next, data associated with interest rates for loans and investments, both current and historical, for each currency and account location, are collected 406, along with the costs for wire transfers and other forms of money transfers. The spread between sell and buy of the various currencies is also collected, both present and historical values, to determine the foreign exchange rate costs.

The time series for exchange rates and interest rates are run through an ARIMA model to predict the interest rates and exchange rates for the coming fifteen days (or whatever window is being used for payments and receipts).

Each currency account is analyzed 407 to maximize the value of the entire universe of currency accounts. First, critical cash needs are identified by reviewing each currency account for predicted negative balances for the current day. These accounts need funding to cover the payments due in the current day. For example, in one embodiment, based on previously recorded user behavior (foreign exchange, swapping, and funding) a machine learning algorithm proposes a number of operations for final validation: change of currency to have an appropriate balance between the main currency recorded, funding accounts that are in overdraft, but also moving cash to interest-earning accounts. Also, following the previous behavior of the system will allocate cash per counterparty to mitigate risk exposure. In case of negative interest existing on accounts in a specific currency, the system will propose to empty those accounts and swap the currencies against an account in currency who generate positive interest.

Regarding payment rejection, the machine learning/artificial intelligence algorithm will propose predictive and prescriptive analytics. For example, a payment that has been rejected before will be flagged and correction in the data will be proposed, also a payment type channel and route will be analyzed against the cut off time and cost per channel banks and alternative channel and route will be proposed to reduce the cost of payments.

Regarding cash exposure and foreign exchange exposure the system will be able to predict variation and encourage mitigation risk actions, for example, but non exhaustively predict that the US Dollar is going up against the Sterling and propose SWAP and Forward FX operation to mitigate loss exposure.

The entire universe of currency accounts is optimized using multivariate forecasting techniques. In one embodiment, the algorithm to optimize the sum of the balances of all of the currency accounts is a mathematical formula. For each day of the future time series, the currency accounts are searched for negative balances. For each account with a negative balance, the accounts with positive balances are searched for the currency with the lowest interest rate and the lowest cost to transfer to the currency with the shortfall. The transfer instructions are then recorded and if necessary, additional funds are sought. Then the funding for the next account with a shortfall is sought until all of the accounts have funding. Then the accounts with a positive balance are defunded to a sweep account in that currency.

In another embodiment, a machine learning algorithm such as K-means, Random Forrest, or DensiCube (see U.S. Pat. No. 9,489,627, issued to Jerzy Bala on Nov. 8, 2016, said patent incorporated herein in its entirety and U.S. patent application Ser. No. 16/355,985, filed by Jerzy Bala and Paul Green on Mar. 18, 2019, said patent application incorporated herein in its entirety) is used to try various scenarios for cash transfers, borrowing, and funding to optimize the balance at the end of the future forecast period. The fields could be the currency, the cash, the interest in, the interest out, the transfer cost, and the foreign exchange rate to various currencies. A second dimension of the fields could be each day of the forecast period. And the attributes could be the currency accounts. Each combination of cash movements is calculated to determine a sum for the scenario (across the entire forecast period and all currency accounts), and the cash movements related to the best scenario is stored until a better scenario is found. Rather than using an F-score as a quality metric, the cash sum could be used as the quality metric. The best scenario at the end of the analysis is then saved as the cash movement plan. The output of the machine learning algorithm is a rules set that dictate the cash movements. In some embodiments, this rules engine is used as the cash movement plan for a single day; in other cases, the rules could be used as the cash management plane for a short period, perhaps a week. See the discussion below for more detailed information on the distributed Densicube algorithm.

In the operations of the machine learning module over a window of a longer period (perhaps a week, 15 days, or a month), the goal is to find opportunities to invest the money in longer-term, higher interest rate notes, such as a 15-day certificate of deposit, rather than solely investing in overnight sweep accounts. The same is true for borrowing money or for transferring cash between accounts: by looking at the longer term, better rates and lower transaction costs can be achieved.

Once the funding plan is calculated, the cash manager 115 moves the money 408 according to the plan to the appropriate account, borrowing or investing money as specified in the plan. Once funding is in place, the payments for the day are paid 409 from the appropriate currency account.

Figure 5:
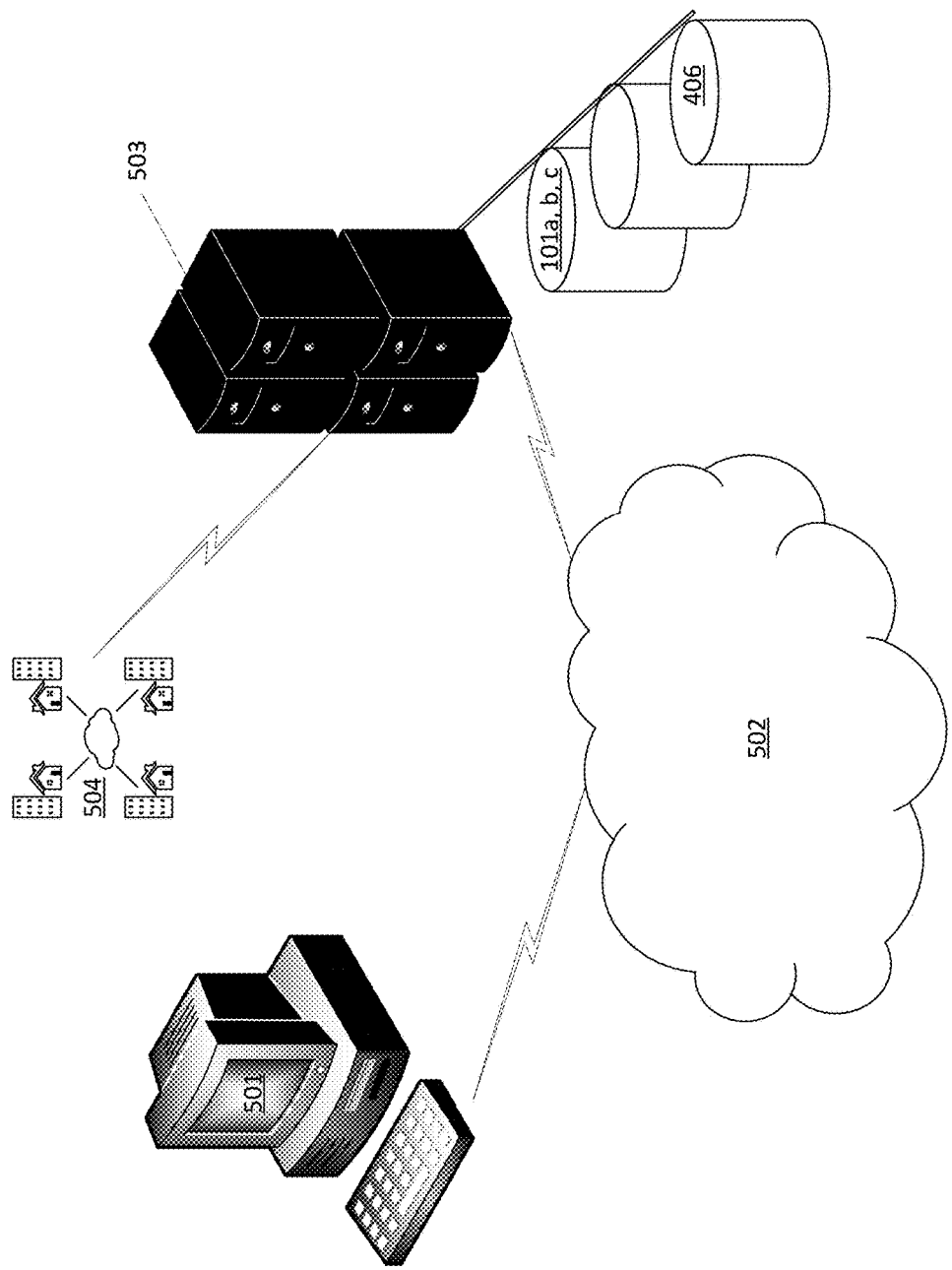
FIG. 5 is a diagram of one possible hardware environment for operating the outcome creation engine.

Because of the complexities of machine learning algorithms, special purpose computing may be needed to build and execute the machine learning model described herein. FIG. 5 shows one such embodiment. The user configures the PCM 110 monitors the currency account status 200 on a personal computing device such as a personal computer, laptop, tablet, smart phone, monitor, or similar device 501, 104, 105. The personal computing device 501, 104, 105 communicates through a network 502 such as the Internet, a local area network, or perhaps through a direct interface to the server 503. The special-purpose machine learning server 503 is a high performance, multi-core computing device (that includes floating-point processing capabilities) with significant data storage facilities 101*a*, 101*b*, 101*c*, 406 (hard disk drives, solid-state drives, optical storage devices, RAID drives, etc) in order to store the transaction data for the PCM 110. Since these databases 101*a*, 101*b*, 101*c*, 406 are continuously updated in some embodiments, this data must be kept online and accessible so that it can be updated. These data analytics require complex computation with large values of data, requiring the special purpose, high-performance server 503. The server 503 is a high-performance computing machine electrically connected to the network 502 and to the storage facilities 101*a*, 101*b*, 101*c*, 406. In addition, the server 503 requires connectivity to the payment rails 504 in order to have secure, high-performance access to the banks 121-126 where the currency accounts are located. The foregoing devices and operations, including their implementation, will be familiar to, and understood by, those having ordinary skill in the art.

Looking at FIG. 6, a bottoms-up method is shown for creating a model of cash flow. A large set of multi-tenant transaction records from one or more banks 601 is accessed. The entire set of transactions 601 could be downloaded to the file storage 406 of server 503. In some cases, these bank transactions 601 are combined 602 with the company transactions 101*a*, 101*b*, 101*c* to provide a universe of transactions upon which to use in the creation of the model. The combined transactions could then be filtered 603 to focus the transaction set on a specific industry. This is done because some forecasting may not desire to have retail sales mixed in with large industries as the cycles of spending may be different.

The transactions are then sorted 604 into specific ledger accounts such as utilities, rent, payroll, and materials (in some embodiments, this sorting uses individual vendor names and in other embodiments, the ledger accounts are grouped). For each ledger account, the sorted transactions are loaded into a time series that is plotted in memory 605. In some embodiments, the transactions are grouped in a time frame 605, and the amounts within the time frame are summed. For instance, the time frame could be daily, weekly, or monthly. In the case of weekly, all transactions for the ledger account within each week are summed, and the time series uses the summed amount. The plotted time series is then processed through the ARIMA algorithm 606 as the model for that ledger account. The model predicts the expected value of transactions for a point in time.

In some embodiments, the data is segregated across a plurality of bank computers, perhaps from a number of different banks. In order to preserve the privacy of the data, the filtering 602, sorting 604, combining 605, and ARIMA algorithm 606 are performed on the bank (or a third party) computers and only the model is transferred to the company for use. See U.S. patent application Ser. No. 16/355,985, filed by Jerzy Bala and Paul Green on Mar. 18, 2019, for a further discussion of distributing machine learning algorithms.

In addition, the company's transactions 101a, 101b, 101c are similarly sorted 611 into the same ledger account categories as used in the sorting 604 of the bank transactions. The sorted company's transactions are then combined into time frames 612 and processed using the ARIMA 613 algorithm to form a company-specific model for each ledger account.

The company-specific ledger account models are then compared 621, on an account-by-account basis, to the ledger account models based on the bank transactions. If the two models are comparable, then the bank transaction model is used going forward. If the ARIMA formulas are the same but the offset, then the constants in the model are adjusted 622 to those in the company-specific model. If the models are not compatible, then the company-specific model is used, or the user is requested to adjust the filtering so that the set of bank transactions more accurately reflects the industry of the company. The final set of ledger account models are then returned 623.

In some embodiments, the bank transactions are not used, and the company-specific transactions are the only data used to create the model.

Figure 7:
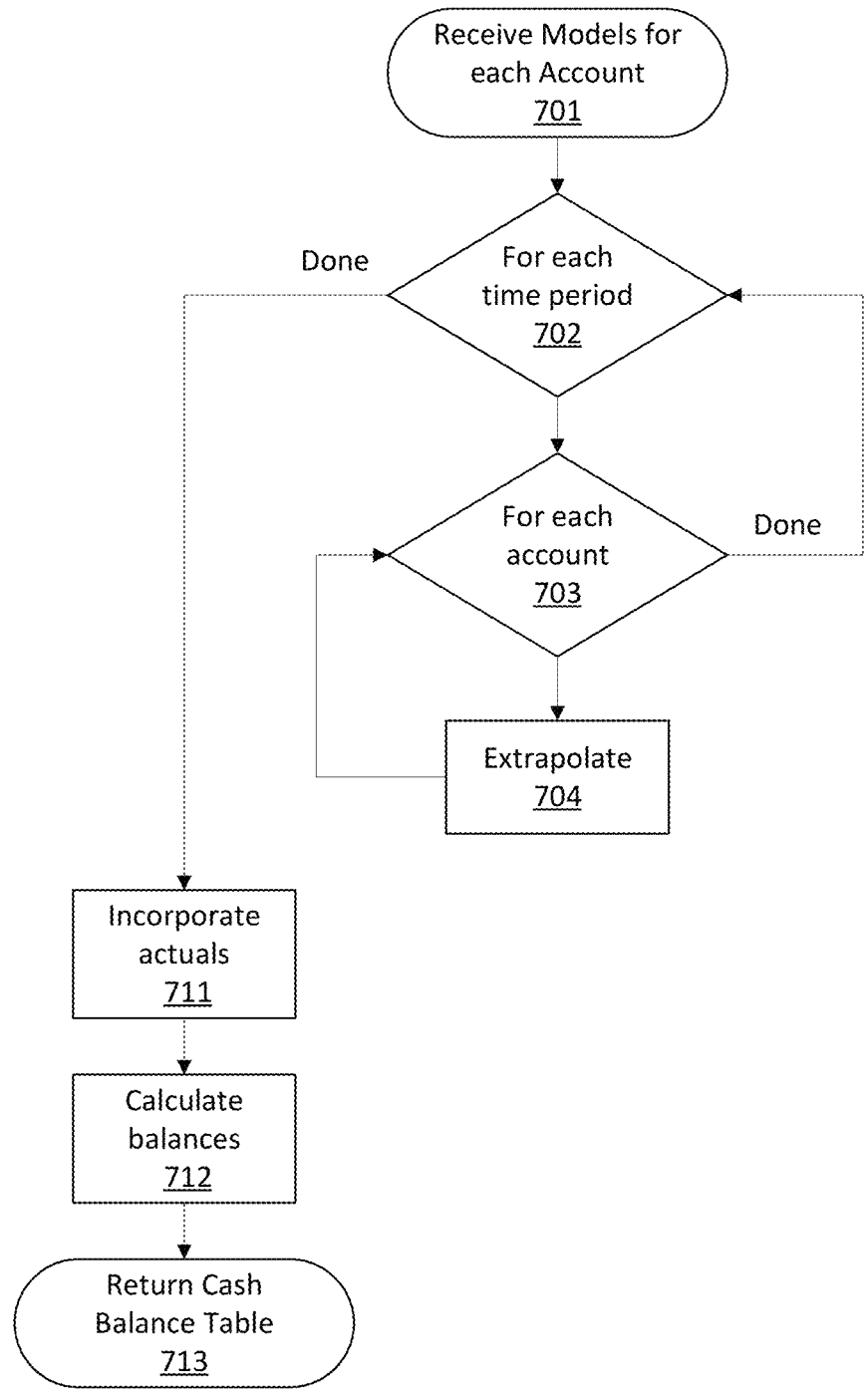
FIG. 7 is an alternative embodiment of the creation of a cash balance table.

The methodology of FIG. 7 shows how to create a chart of predicted cash flows from the ledger account models. First, the ledger account models are received 701. Then, for each time period 702 in the chart, and for each ledger account 703 the model is used to extrapolate 704 the expected amount of expense or receipts for that ledger account for the time period. When each ledger account is competed for each time period, the resulting chart is adjusted 711 in the near term (15-30 days) to use actual data for invoices on hand and receipts that have already been invoiced. Once the chart of cash changes is created, the cash balances 712 for each period can be calculated by adding the amount of the available cash for the previous period to the sum of the receipts for the period and subtracting the expenses for the period. The entire cash flow chart is then returned 713.

This cash flow chart can then be inputted to the machine learning 407 processes in FIG. 4 to determine the movement of cash to cover shortfalls in currency accounts or to invest excess cash.

The following description outlines several possible embodiments to create models using distributed data. The Distributed DensiCube modeler and scorer described below extend the predicative analytic algorithms that are described in U.S. Pat. No. 9,489,627 to extend their execution in distributed data environments and into quality analytics. The rule learning algorithm for DensiCube is briefly described below. But the DensiCube machine learning algorithm is only one embodiment of the inventions herein. Other machine learning algorithms could also be used.

Rule Learning Algorithm

Figure 8:
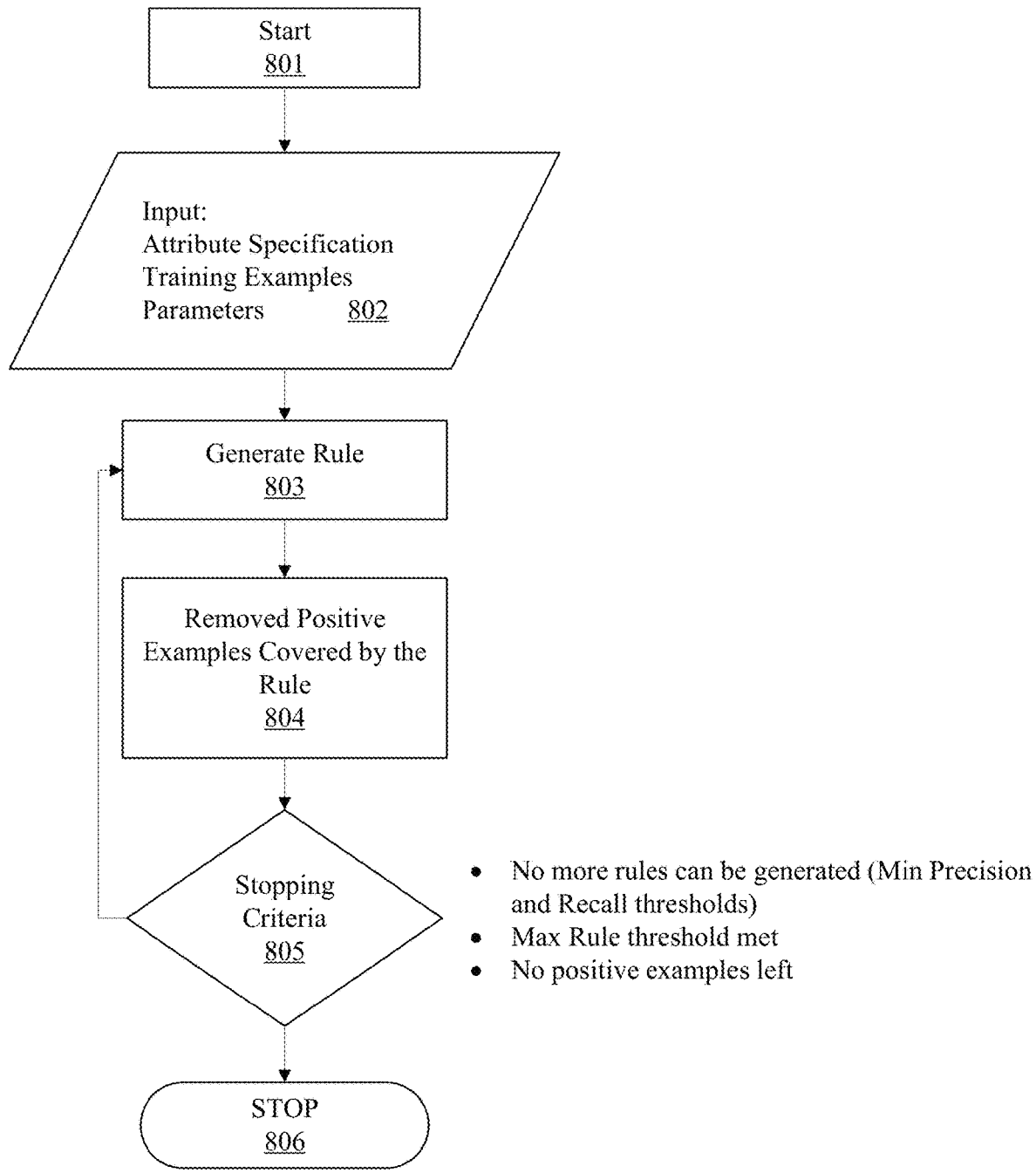
FIG. 8 is a flowchart showing rule generation.

The rule learning algorithm induces a set of rules. A rule itself is a conjunction of conditions, each for one attribute. A condition is a relational expression in the form:

$$A=V,$$

where A is an attribute and V is a nominal value for a symbolic attribute or an interval for a numeric attribute. The rule induction algorithm allows for two important learning parameters 802: minimum recall and minimum precision. More specifically, rules generated by the algorithm must satisfy the minimum recall and minimum precision requirements 805 as set by these parameters 802. The algorithm repeats the process of learning a rule 803 for the target class and removing all target class examples covered by the rule 804 until no rule can be generated to satisfy the minimum recall and minimum precision requirements 805 (FIG. 8). In the distributed DensiCube algorithm, the removal of the positive examples covered by the rule is done in parallel at each of the distributed servers that hold the data.

Figure 9:
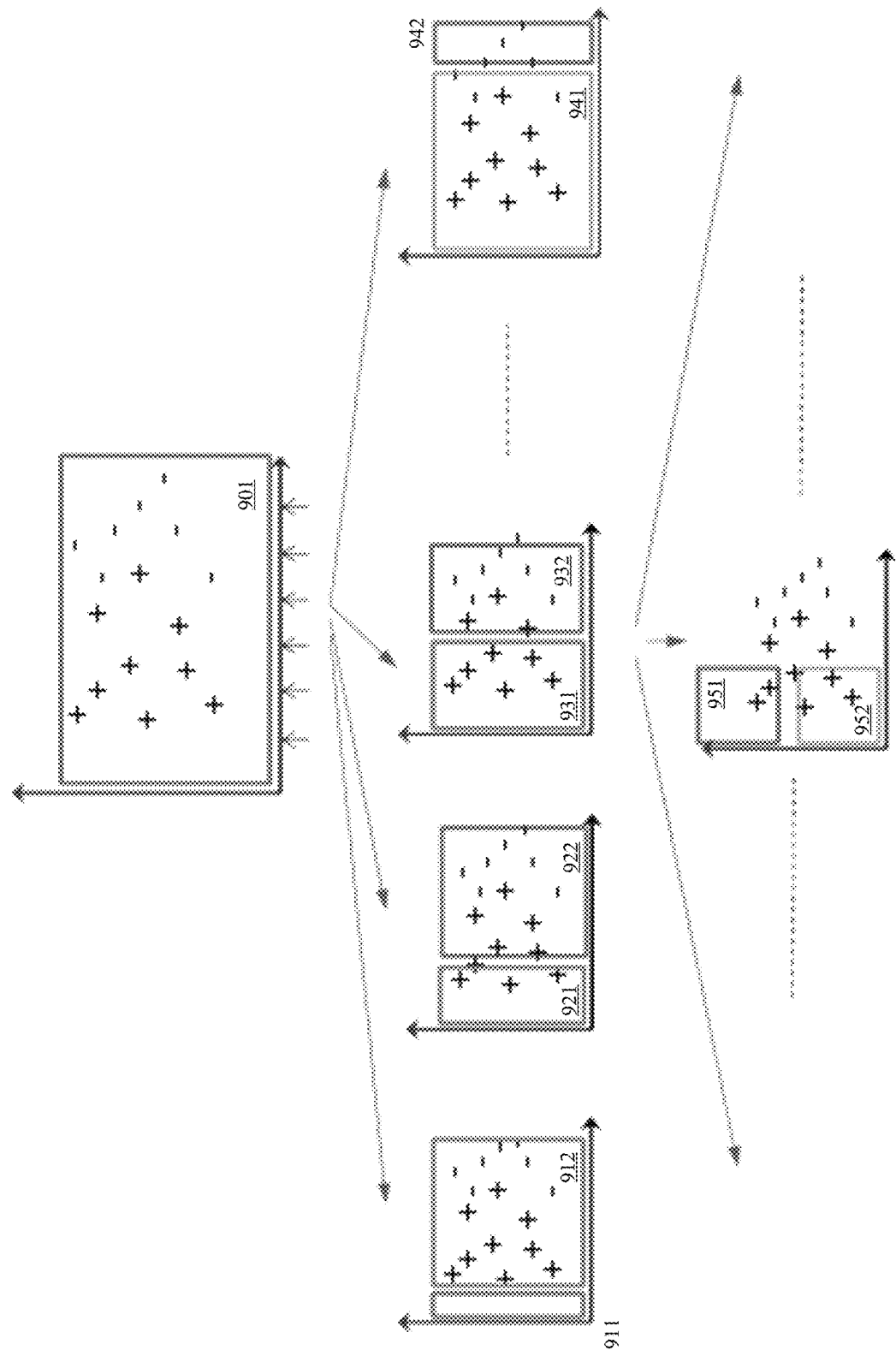
FIG. 9 shows a K-beam search based on rule specialization.

In learning a rule, as seen in FIG. 9, the algorithm starts with the most general rule 901, which covers the entire feature space (all examples both positive and negative) and then conducts a general-to-specific beam search. At each step of the search, the algorithm maintains a set of k best rules (rules with the largest F-measure scores), where k is a user defined parameter. A smaller k translates into a smaller search space, hence a faster search. Each of the best rules is specialized by either adding a new condition or reducing the interval of a condition of a numeric attribute. This search process repeats until the recalls of all rules are smaller than the minimum recall and the best rule is the rule generated by the rule search process. However, any rule learning approach that follows the covering rule generation schema can be used here (i.e., search for the "best" rule, remove the data explained/covered by this rule, and repeat the search process).

Looking at 911, 912, the rule 912 covers all of the positive and negative values, and rule 911 is empty. This rule set is then scored and compared to the base rule 901. The best rule is stored.

Next, the algorithm increments the x-axis split between the rules, creating rule 931 and 932. The rules are scored and compared to the previous best rule.

The process is repeated until all but one increment on the x-axis is left. These rules 941, 942 are then scored, compared, and stored if the score is better.

Once the x-axis has been searched, the best rules are then split on the y-axis (for example, 951,952) to find the best overall rule. This process may be repeated for as many axes as found in the data.

In the Distributed DensiCube algorithm, the functions shown in FIG. 9 are performed independently on multiple data silos operating on the different features that reside on those silos.

Figure 10:
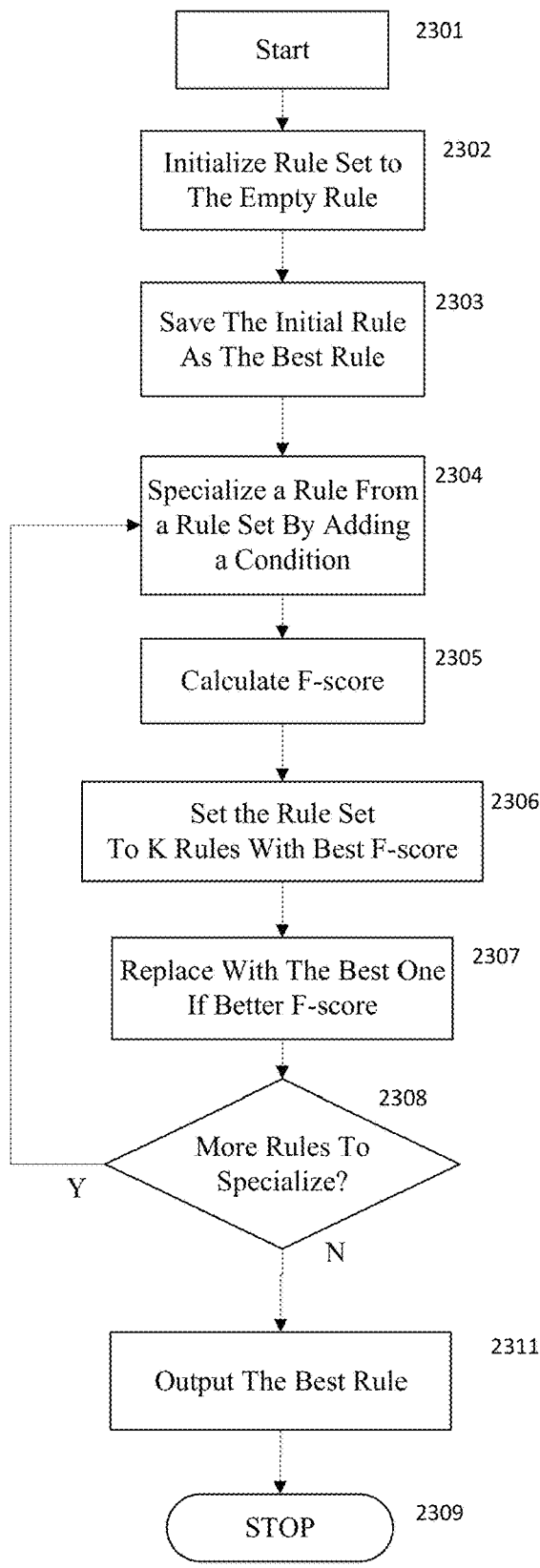
FIG. 10 is a flow chart of rule specialization and evaluation.

FIG. 10 depicts the internal process of generating a singular rule. It starts 2301 with the step of initializing the risk model with a rule that describes the whole representation space 2302 (i.e., a rule with conditional parts satisfying all attributes values). The initial rule is stored as the best rule 2303. This rule is iteratively specialized via a k-beam search process of re-referencing its value ranges for each of the attributes 2304. The specialization includes calculating the F-score 2305, setting the rule set to the K rules with the best F-score 2306, and replacing the Best Rule if this rule has the better F-Score 2307. This continues while there are more rules to specialize 2308. If not, the algorithm outputs the Best Rule 2311 and stops 2309. The top k rules, based on the evaluation measure, are maintained on the candidate list 1105 during this process. All the rules on the candidate list 1105 are evaluated and ranked. The best rule from the candidate rule list (i.e., an internal rule set maintained by the beam search algorithm) enters the model rule list (FIG. 11).

In the Distributed DensiCube algorithm, the entire process described in FIG. 10 is distributed, performed on each data silo.

Figure 11:
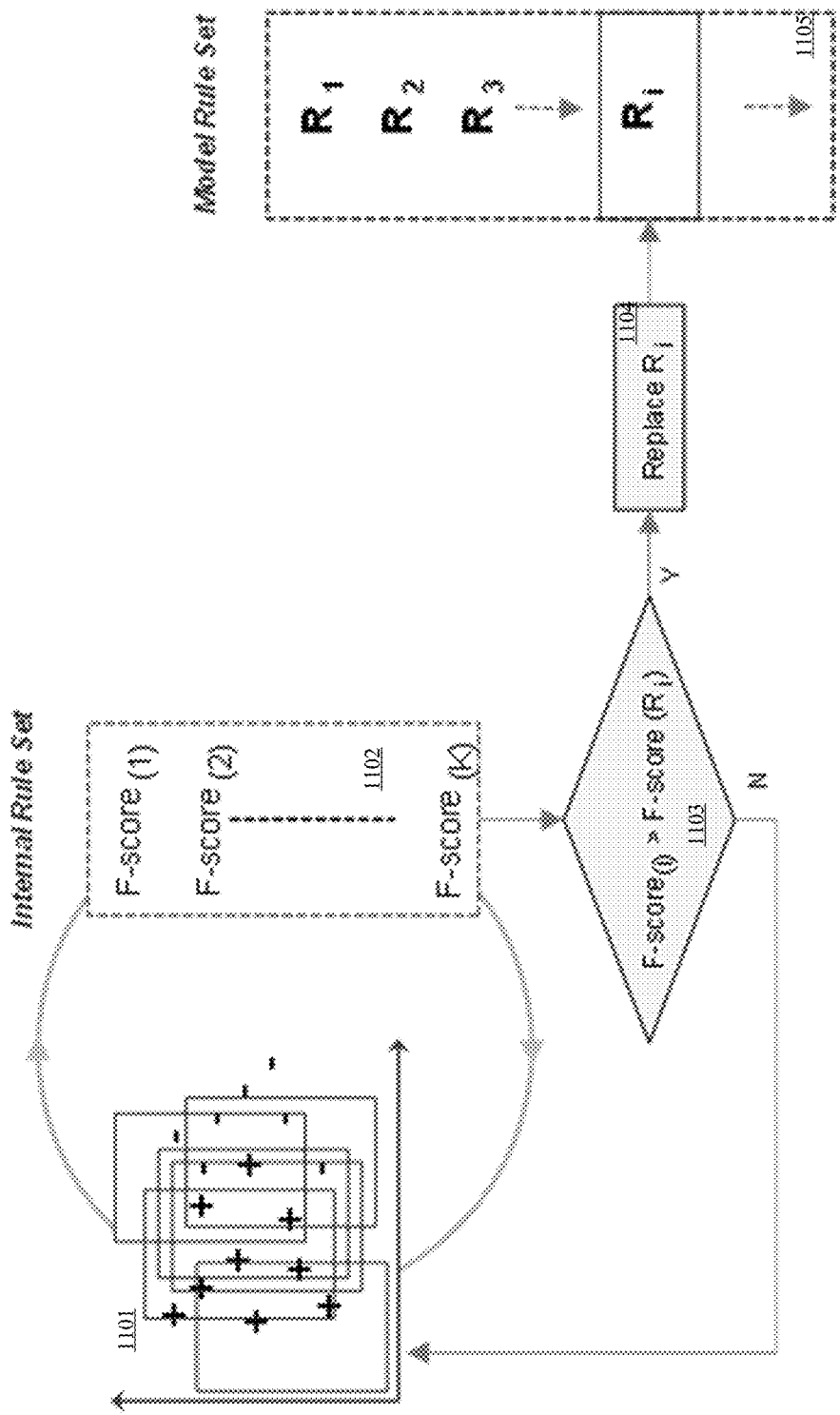
FIG. 11 illustrates a rule generation process with the internal rule list and the final model rule list.

Looking at FIG. 11, the rule 1101 is analyzed and the F-scores of each sub-rule is recorded in the internal rule set 1102. If the F-score 1102 for the rule 1101 is greater than the last F-score 1103, then the last rule is replaced by the new rule 1104. Various algorithms could be reserved here, for instance, the rule set could be a sorted list of pairs of the rule set and the rule's F-score. Also, the statistics of other machine learning quality measures could be used. When comparing 1103, the list is searched and the new rule inserted 1104, dropping off the lowest scoring rule set.

Every rule induction algorithm uses a metric to evaluate or rank the rules that it generates. Most rule induction algorithms use accuracy as the metric. However, accuracy is not a good metric for imbalanced data sets. The algorithm uses an F-measure as the evaluation metric. It selects the rule with the largest F-measure score. F-measure is widely used in information retrieval and in some machine learning algorithms. The two components of F-measure are recall and precision. The recall of a target class rule is the ratio of the number of target class examples covered by the rule to the total number of target class examples. The precision of a target class (i.e., misstatement class) rule is the ratio of the number of target class examples covered by the rule to the total number of examples (from both the target and non-target classes) covered by that rule. F-measure of a rule r is defined as:

$$F-\text{measure}(r) = \frac{\beta^2 + 1}{\frac{\beta^2}{\text{recall}(r)} + \frac{1}{\text{precision}(r)}}$$

where $\beta$ is the weight. When $\beta$ is set to 1, recall and precision are weighted equally. F-measure favors recall with $\beta>1$ and favors precision with $\beta<1$. F-measure can be used to compare the performances of two different models/rules. A model/rule with a larger F-measure is better than a model/rule with a smaller F-measure.

Prototype Generation Algorithm for Ranking with Rules

The algorithms incorporate a method, called prototype generation, to facilitate ranking with rules. For each rule generated by the rule learning algorithm, two prototypes are created. In generating prototypes, the software ignores symbolic conditions, because examples covered by a rule share the same symbolic values. Given a rule R with m numeric conditions: $A_{R1}=V_{R1} \wedge A_{R2}=V_{R2} \wedge \ldots \wedge A_{Rm}=V_{Rm}$, where $A_{Ri}$ is a numeric attribute and $V_{Ri}$ is a range of numeric values, the positive prototype of R, $P(R)$ $(p_{R1}, p_{R2}, \ldots, p_{Rm})$ and the negative prototype of R $N(R)=(n_{R1}, n_{R2}, \ldots, n_{Rm})$, where both $p_{Ri} \in V_{Ri}$ and $n_{Ri} \in V_{Ri}$. $p_{Ri}$ and $n_{Ri}$ are computed using the following formulas:

$$p_{Ri} = \frac{\sum_{e \in R(POS)} e_{Ri}}{|R(POS)|} \text{ and } n_{Ri} = \frac{\sum_{e \in R(NEG)} e_{Ri}}{|R(NEG)|},$$

where R(POS) and R(NEG) are the sets of positive and negative examples covered by R respectively, $e=(e_{R1}, e_{R2}, \ldots, e_{Rm})$ is an example, and $e_{Ri} \in V_{Ri}$ for i=1, m, because e is covered by R.

Given a positive prototype $P(R)=(p_{R1}, p_{R2}, \ldots, p_{Rm})$ and a negative prototype $N(R)=(n_{R1}, n_{R2}, \ldots, n_{Rm})$ of rule R, the score of an example $e=(e_{R1}, e_{R2}, \ldots, e_{Rm})$ is 0 if e is not covered by R. Otherwise, e receives a score between 0 and 1 computed using the following formula:

$$\text{score}(e, R) = \frac{\sum_{i=1}^{m} w_{Ri} \frac{|e_{Ri} - n_{Ri}| - |e_{Ri} - p_{Ri}|}{|p_{Ri} - n_{Ri}|} + \sum_{i=1}^{m} w_{Ri}}{2 \times \sum_{i=1}^{m} w_{Ri}}$$

where $w_{Ri}$ is the weight of $Ri^{th}$ attribute of R. The value of $$\frac{|e_{Ri} - n_{Ri}| - |e_{Ri} - p_{Ri}|}{|p_{Ri} - n_{Ri}|}$$

is between −1 and 1. When $e_{Ri}>n_{Ri}>p_{Ri}$ or $p_{Ri}>n_{Ri}>e_{Ri}$ it is −1. When $e_{Ri}>p_{Ri}>n_{Ri}$ or $n_{Ri}>p_{Ri}>e_{Ri}$ it is 1. When $e_{Ri}$ is closer to $n_{Ri}$ than $p_{Ri}$, it takes a value between −1 and 0. When $e_{Ri}$ is closer to $p_{Ri}$ than $n_{Ri}$, it takes a value between 0 and 1. The value of score(e, R) is normalized to the range of 0 and 1. If $p_{Ri}=n_{Ri}$, then $$\frac{|e_{Ri} - n_{Ri}| - |e_{Ri} - p_{Ri}|}{|p_{Ri} - n_{Ri}|}$$

is set to 0.

$w_{Ri}$ is computed using the following formula.

$$w_{Ri} = \frac{|p_{Ri} - n_{Ri}|}{\max_{Ri} - \min_{Ri}},$$

where $\max_{Ri}$ and $\min_{Ri}$ are the maximum and minimum values of the $Ri^{th}$ attribute of R, respectively. The large difference between $p_{Ri}$ and $n_{Ri}$ implies that the values of positive examples are very different from the values of negative examples on the $Ri^{th}$ attribute, so the attribute should distinguish positive examples from negative one well.

Scoring Using Rules

A rule induction algorithm usually generates a set of overlapped rules. Two methods, Max and Probabilistic Sum, for combining example scores of multiple rules are used by the software. Both methods have been used in rule-based expert systems. The max approach simply takes the largest score of all rules. Given an example e and a set of n rules $R=\{R_1, \ldots, R_n,\}$, the combined score of e using Max is computed as follows:

$$\text{score}(e,R) = \max_{i=1}^{n}\{\text{Precision}(Ri) \times \text{score}(e,R_i)\}$$

where precision($R_i$) is the precision of $R_i$. There are two ways to determine score(e, R) for a hybrid rule. The first way returns the score of e received from rule R for all e's. The second way returns the score of e received from $R_i$, only if the score is larger than or equal to the threshold of $R_i$, otherwise the score is 0. The first way returns. For a normal rule, $$\text{score}(e, R_i) = \begin{cases} 1 & \text{if } e \text{ is covered by } R_i \\ 0 & \text{Otherwise} \end{cases}$$

For the probabilistic sum method, the formula can be defined recursively as follows.

$$\text{score}(e,\{R_1\}) = \text{score}(e,R_1)$$

$$\text{score}(e,\{R_1,R_2\}) = \text{score}(e,R_1) + \text{score}(e,R_2) - \text{score}(e,R_1) \times \text{score}(e,R_2)$$

$$\text{score}(e,\{R_1, \ldots, R_n\}) = \text{score}(e,\{R_1, \ldots, R_{n-1}\}) + \text{score}(e,R_n) - \text{score}(e,\{R_1, \ldots, R_{n-1}\}) \times \text{score}(e,R_n)$$

Hardware Architecture

Figure 12:
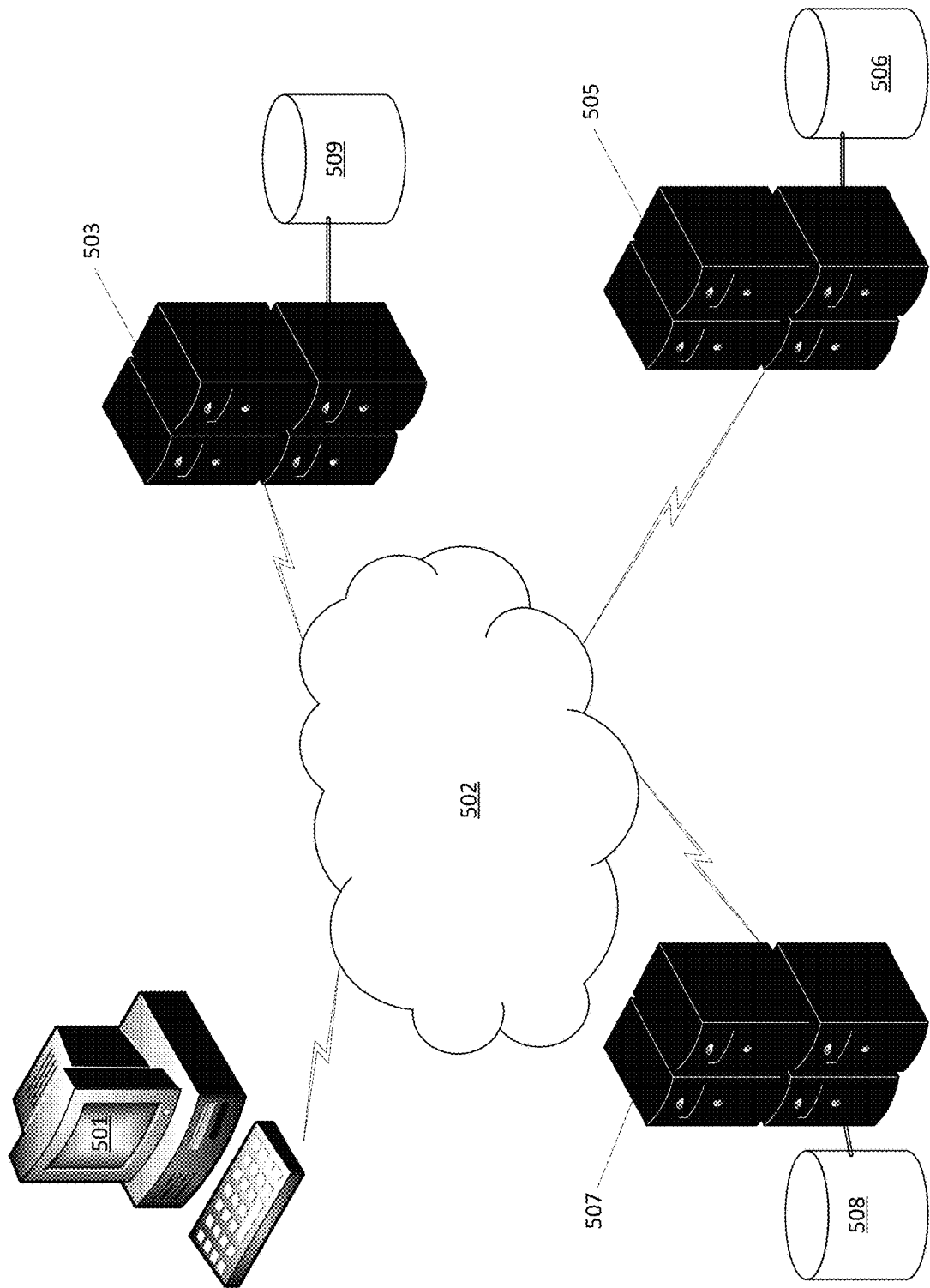
FIG. 12 is an electrical architecture of one embodiment.
Figure 13A:
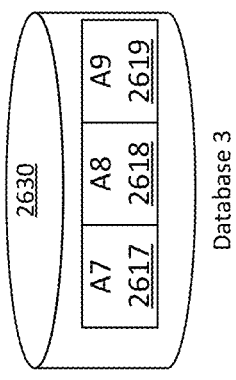
FIG. 13A is a diagram showing horizontal fragmentation of the data across multiple sites.
Figure 13A:
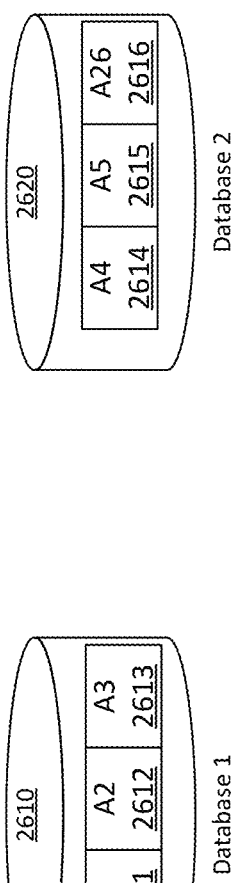
Figure 13B:
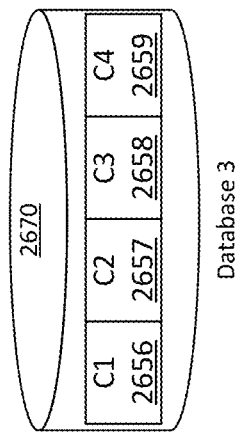
FIG. 13B shows a diagram showing vertical fragmentation of attributes across multiple sites.
Figure 13B:
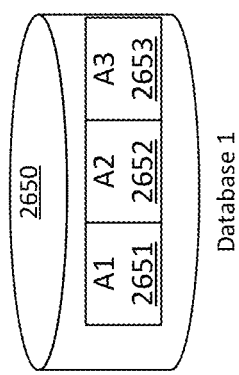

Turning to FIG. 12, we see a hardware architecture for implementing the distributed DensiCube algorithms. At the center of the distributed architecture is the cloud 502, which could be implemented as any type of network, from the Internet to a local area network or similar. Off of the cloud 502 are three servers 503, 505, 507, although any number of servers could be connected to the cloud 502. Each server 503, 505, 507 have a storage facility 509, 506, 508. There storage facilities 509, 506, 508 hold the databases as seen in FIGS. 13A and 13B 2610, 2620, 2630, 2650, 2660, 2670. Personal computer 501 (a laptop, desktop or server 1001) could operate the algorithms to combine the distributed rules or this combination could occur on any server 503, 505, 507. The servers 503, 505, 507 (or data silos 1002) are not ordinary computers as the servers must have the performance to handle the highly computationally intensive efforts to operate the DensiCube algorithm described above. In addition, for many datasets, the storage facilities 509, 506, 508 must be able to hold very large databases 2610, 2620, 2630, 2650, 2660, 2670.

Distributed DensiCube

By allowing for distributed execution, the Distributed DensiCube algorithm allows for a number of important benefits. First of all, privacy of the data assets in the model generation and prediction modes of operation are preserved by keeping the data in its original location and limiting access to the specific data. Second, the cost of implementing complex ETL processes and data warehousing in general is reduced by eliminating the costs of transmission to and storage in a central location. Third, these inventions increase performance by allowing parallel execution of the DensiCube algorithm (i.e., executing the predictive analytics algorithms on a distributed computing platforms). In addition, this distributed algorithm provides the capability for the Distributed DensiCube algorithm to provide unsupervised learning (e.g., fraud detection from distributed data sources). Finally, it allows predictive analytics solutions to operate and react in real time on a low-level transactional streaming data representation without requiring data aggregation.

The Distributed DensiCube approach represents a paradigm shift of moving from the currently predominant Data Centric approaches to predictive analytics, i.e., approaches that transform, integrate, and push data from distributed silos to predictive analytics agents, to the future Decision Centric (predictive analytics bot agent based) approaches, i.e., approaches that push predictive analytics agents to the data locations and by collaborating support decision-making in the distributed data environments.

Essentially, the distributed DensiCube algorithm operates the Densicube algorithm on each server 503, 505, 507 analyzing the local data in the database 509, 506, 508. The best rule or best set of rules 1105 from each server 503, 505, 507 is then combined into the best overall rule. In some embodiments, several servers could work together to derive a best rule, that is combined with another server.

Collaborating predictive analytics bot agents can facilitate numerous opportunities for enterprise data warehousing to provide faster, more predictive, more prescriptive, and time and cost saving decision-making solutions for their customers.

Distributed DensiCube Concept of Operation

The following sections describe the concept behind the Distributed DensiCube approach. As mentioned in the previous section, the Distributed DensiCube solution continues to use the same modeling algorithms as the current non-distributed predictive analytics solution (with modifications to the scoring algorithms to support privacy by preserving the data assets in silos).

1.1 Distributed Modeling

The Distributed DensiCube operates on distributed entities at different logical and/or physical locations.

The distributed entity represents a unified virtual feature vector describing an event (e.g., financial transaction, customer campaign information). Feature subsets 2704, 2705 of this representation are registered/linked by a common identifier (e.g., transaction ID, Enrolment Code, Invoice ID, etc.) 2707. Thus, a distributed data 2701 represents a virtual table 2706 of joined feature subsets 2704, 2705 by their common identifier 2707 (see FIG. 14).

Figure 14:
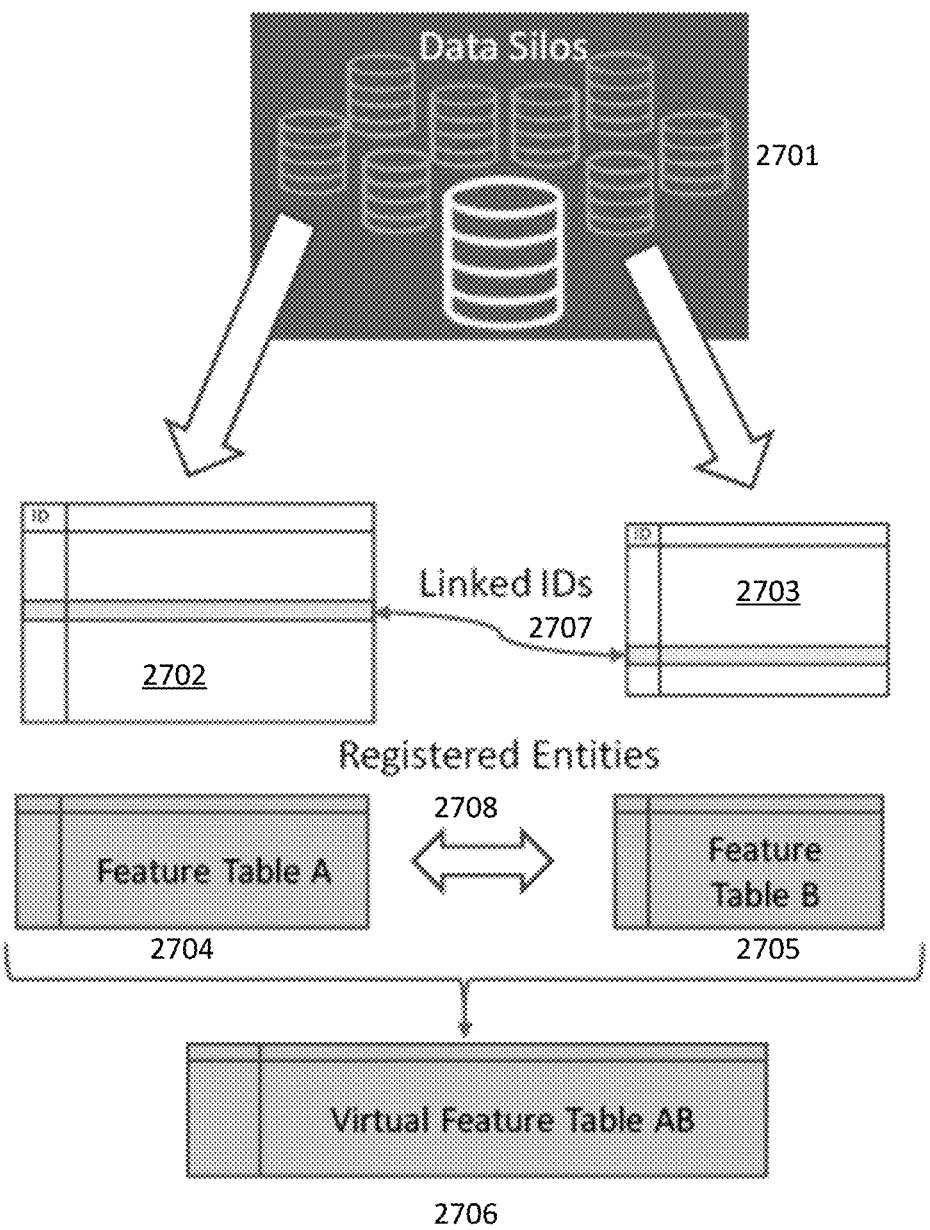
FIG. 14 is a view of a virtual feature table showing the distributed entities.

In FIG. 14, there are a number of data silos 2701 located at distributed locations across a network. Two of these data sets 2702, 2703 are called out in FIG. 14, although any number of data sets could be used. The data sets 2702, 2703 are essentially tables in some embodiments, each with an identifier column. These identifiers provide a link 2707 between records in the two data sets 2702, 2703. In most, but not all, embodiments, there is a one to one correspondence between the records in the data sets 2702, 2703. The records in the data sets 2702, 2703 include feature tables 2704, 2705 of the registered entities 2708 (registered records of the data sets 2702, 2703). These feature tables 2704, 2705 are virtually combined into a virtual feature table 2706.

As an example of the distributed DensiCube algorithm, see FIG. 15. In this figure, there is an identifier 801 that is a social security number (SSN). The identifier 801 is used in each of the three databases 802, 803, 804. In this simplified example, the bank database 802 contains three fields, the ID (SSN), the Default field, and the amount borrowed. The Default field is a negative if the loan is in default and positive if the loan is current.

Figure 16A:
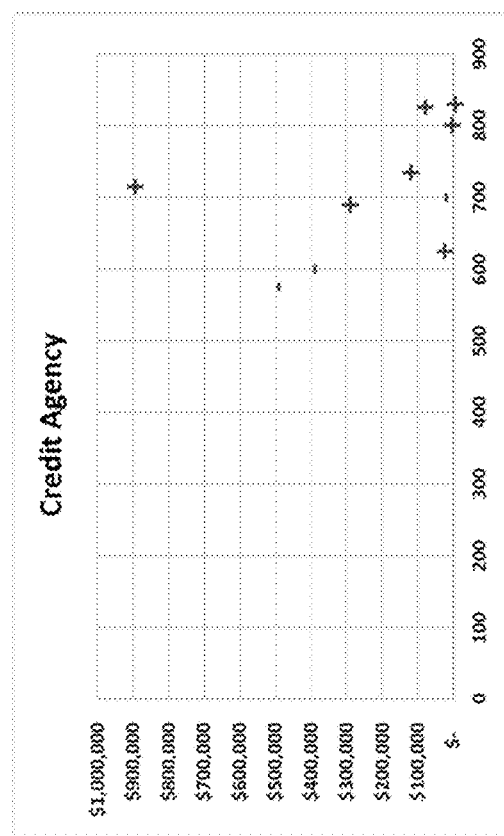
FIG. 16A is a graphical view of the data from FIG. 8 from one of the servers.
Figure 16B:
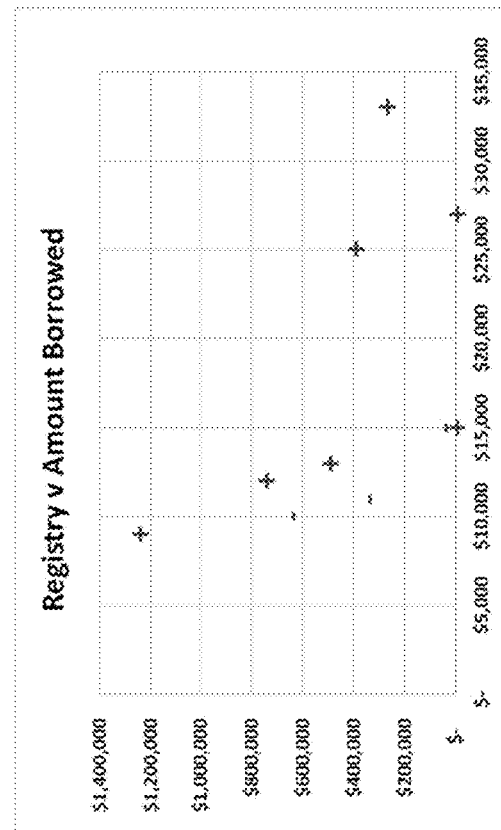
FIG. 16B is a graphical view of the data from FIG. 8 from two of the servers.

The credit agency database 803 contains three fields, the ID (SSN), the Credit Score, and the Total Debt fields. The registry of deeds database 804 also has three fields in this example, the ID (SSN), a home ownership field, and a home value field. In our example, there are a number of reasons that the data in the credit agency 803 needs to be kept separate from the registry data 804, and both of those dataset need to be kept separate from the bank data 802. As a result, the DensiCube algorithm is run three times on each of the databases 802, 803, 804. In another embodiment, two of the servers could be combined, with the algorithm running on one of the servers. This embodiment is seen in FIG. 16B, where the registry data 805 is combined with the bank information 803 to create a scatter diagram to perform the DensiCube algorithm upon. In FIG. 16A, the data from the credit agency database 803 is diagramed independently from the other datasets. The DensiCube algorithm is then run on this scatter diagram.

Figure 17:
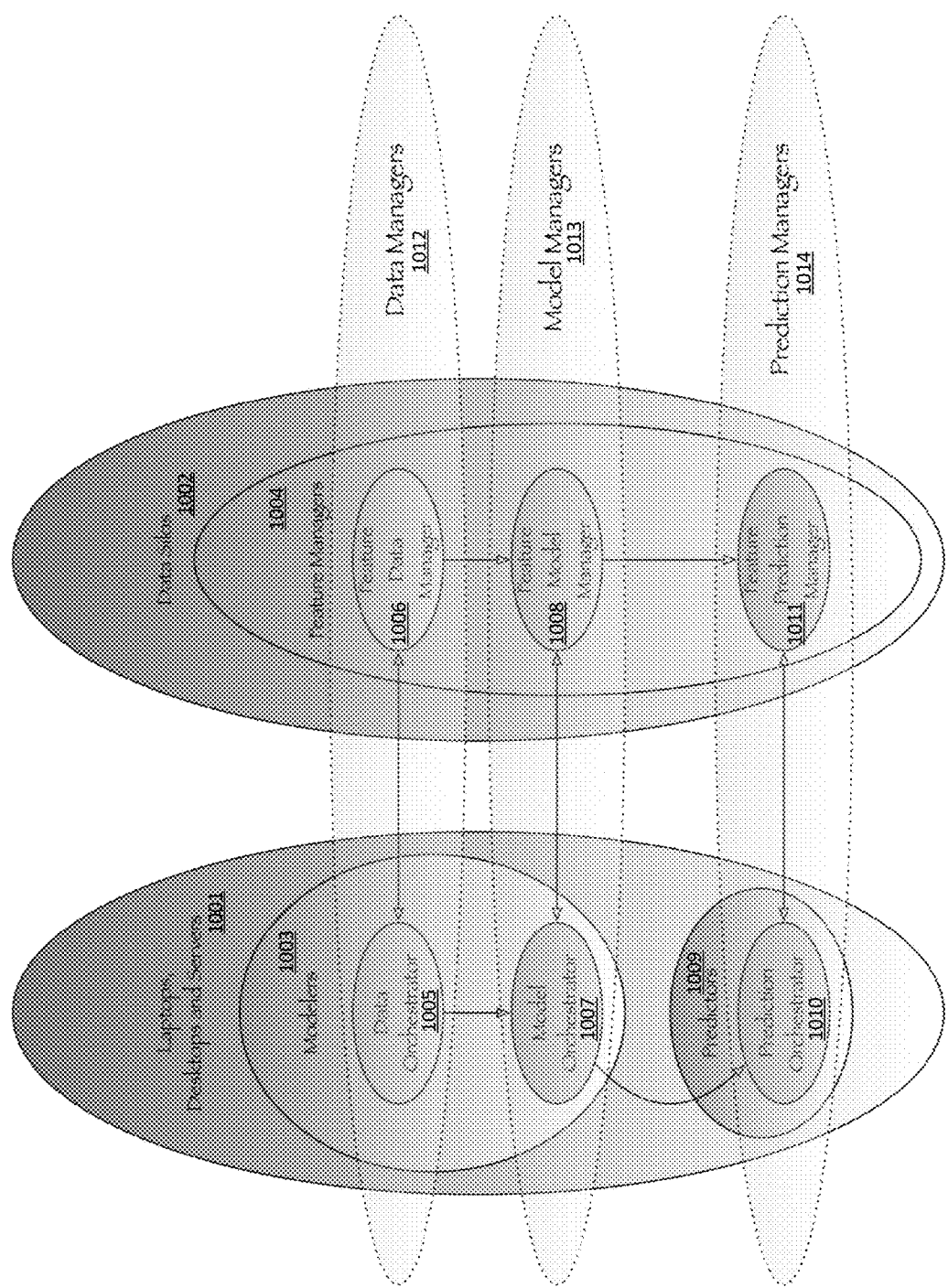
FIG. 17 illustrates the communication between the Distributed DensiCube components.

As seen in FIG. 17, the Distributed DensiCube is accomplished via a synchronized collaboration of the following components, operating on the laptops, desktops, or servers 1001 (see also 501 in FIG. 12) and the plurality of data silos 1002 (see also 503, 505-509 in FIG. 12):

Modeler 1003 on the servers 1001
Feature managers 1004 on multiple data silos 1002
Predictors 1009 on the servers 1001

All the above components collaborate to generate models and use them for scoring, and at the same time, preserve the privacy of the data silos 1002. There are three levels of privacy that are possible in this set of inventions. The first level could preserve the data in the silos, providing privacy only for the individual data records. A second embodiment preserves that attributes of the data in the silos, preventing the model from knowing the attributes. The second embodiment may also hide the features (names of attributes) by instead returning an pseudonym for the features. In the third embodiment, the features themselves are kept hidden in the silos. For example, in the first level, that the range of the credit scores is between 575 and 829 is reported back to the modeler 1003, but the individual record is kept hidden. In the second embodiment, the modeler 1003 are told that credit scores are used, but the range is kept hidden on the data silo 1002. In the third embodiment, the credit score feature itself is kept hidden from the modeler 1003. In this third embodiment, the model itself is distributed on each data silo, and the core modeler 1003 has no knowledge of the rules used on each data silo 1002.

The collaboration between distributed components results in a set of rules generated through a rule-based induction algorithm. The DensiCube induction algorithm, in an iterative fashion, determines the data partitions based on the feature rule based on the syntactic representation (e.g., if feature F>20 and F<−25). It dichotomizes (splits) the data into partitions. Each partition is evaluated by computing statistical quality measures. Specifically, the DensiCube uses an F-Score measure to compute the predictive quality of a specific partition. In binary classification the F-score measure is a measure of a test's accuracy and is defined as the weighted harmonic mean of the test's precision and recall. Precision (also called positive predictive value) is the fraction of relevant instances among the retrieved instances, while Recall (also known as sensitivity) is the fraction of relevant instances that have been retrieved over the total amount of instances.

Specifically, the following steps are executed by Distributed DensiCube:

1) The modelers 1003 invokes feature managers 1004 that subsequently start data partitioning based on the local set of features at the data silo 1002. This process is called specialization.

2) Feature managers 1004 push their computed partitions (i.e., using the data identifier as the partition identifier) and their corresponding evaluation measures (e.g., F-score) to modelers 1003.

3) Each feature model manager 1008 compares evaluation measures of the sent partitions and selects the top N best partitions (i.e. specifically it establishes the global beam search for the top preforming partitions and their combinations).

4) Subsequently, the modeler 1003 proceeds to the process of generating partition combinations. The first iteration of such combinations syntactically represent two-conditional rules (i.e., a partition is represented by a joint of lower and upper bounds of two features). Once this process is completed the identifiers of the two-conditional rules are sent to the feature managers 1004. Once received, feature managers 1004 evaluate the new partitions identified by the identifiers by executing the next iteration specialization.

A data manager 1012 is a logical construct which is comprised of a data orchestrator 1005 and one or more feature data managers 1006, which cooperate to manage data sets. Data sets can be used to create models and/or to make predictions using models. A data orchestrator 1005 is a component which provides services to maintain Data Sets, is identified by its host domain and port, and has a name which is not necessarily unique. A feature data manager 1006 is a component which provides services to maintain Feature Data Sets 1203, is identified by its host domain and port, and has a name which is not necessarily unique. A data set lives in a data orchestrator 1005, has a unique ID within the data orchestrator 1005, consists of a junction of Feature Data Sets 1203, joins Feature Data Sets 1203 on specified unique features, and is virtual tabular data (see FIG. 19). Each column 1206, 1207 is a feature from a Feature Data Set 1203. The columns also are associated with a feature data manager 1202. Each row is a junction of Events 1204 from each Feature Data Set 1203. The join feature attribute values 1205 are the joined features attributes from each row and column. The entire junction is the table 1201.

A model manager 1013 is a logical construct which is comprised of a model orchestrator 1007 and one or more feature model managers 1008, which cooperate to generate models.

A prediction manager 1014 is a logical construct which is comprised of a prediction orchestrator 1010 and one or more feature prediction managers 1011, which cooperate to create scores and statistics (a.k.a. predictions).

1.2 Distributed Scoring

The distributed scoring process is accomplished in two steps. First, partial scores are calculated on each feature manager 1004 on each server. Then, complete scores are calculated from the partial scores.

The combined scores are the sum of the scores from each server divided by the sum of the weights from each server, multiplied by two:

$$\text{score}(e, R) = \frac{ScoreA + ScoreB}{2 \times \sum_{i=1}^{m} w_{Ri}}$$

In this formula, the score for server A and B are similar to the DensiCube scoring described above.

$$ScoreA = \sum_{i=1}^{m} w_{Ri}\left(\frac{|e_{Ri} - n_{Ri}| - |e_{Ri} - p_{Ri}|}{|p_{Ri} - n_{Ri}|} + 1\right)$$

$$ScoreB = \sum_{i=1}^{m} w_{Ri}\left(\frac{|e_{Ri} - n_{Ri}| - |e_{Ri} - p_{Ri}|}{|p_{Ri} - n_{Ri}|} + 1\right)$$

The weights are also determined for each location, as above.

$$w_{Ri} = \frac{|p_{Ri} - n_{Ri}|}{\max_{Ri} - \min_{Ri}}$$

$$w_{Ri} = \frac{|p_{Ri} - n_{Ri}|}{\max_{Ri} - \min_{Ri}}$$

With the combined score, we have a metric to show the validity of the selected model.

2.0 Initial Architectural Concept of Operation and Requirements

2.1 Feature Manager 1004

At the initialization of the machine learning model generation process, each feature manager 1004 is setup on the local servers 1002. Each feature manager 1004 must be uniquely named (e.g., within the subnet where it lives). The port number where the feature manager 1004 can be reached needs to be defined. Access control needs to be configured, with a certificate for the feature manager 1004 installed and the public key for each modeler 1003 and feature prediction manager 1011 installed to allow access to this feature manager 1004. Each local feature manager 1004 needs to broadcast the name, host, port and public key of the feature manager 1004. In some embodiments, the feature manager 1004 needs to listen to other broadcasts to verify uniqueness.

Next, the data sources are defined. A seen in FIGS. 15 and 19, the data source is tabular form (Rows & Columns). In another embodiment, a Relation Data Source is a collection of Data Tables which themselves contain tabular data. The important characteristic is to be able to define a Data Set Template which results in the Column definition of tabular data. Each Data Source must be uniquely identified by name within a feature manager 1004. Each Column must be uniquely identified by name within a Data Source. At least one Column in each Data Source must be unique and suitable for joining to other Data Sources. It must have meaning outside the Data Source such that the feature model managers 1008 can join the Data Source to other Data Sources.

Each Data Source shall be described by a name for the data source and a plurality of columns, where each column has a name, a data type, and a uniqueness field. Data Sources can be used by feature model managers 1008 or feature prediction managers 1011 or both. Data Sources are probably defined by calls from a modeler 1003.

The next step involves defining the Data Set Templates. A Data Set Template is a specification of how to join Data Sources defined within a feature data manager 1006. Each Data Set Template must be uniquely identified by name within a feature data manager 1006. A Data Set Template is a definition of Columns without regard to the Rows in each Data Source. For example, a Data Set Template could be represented by a SQL select statement with columns and join conditions, but without a where clause to limit rows. Data Set Templates can be used by feature model managers 1008 or feature prediction managers 1011 or both. Data Set Templates are probably defined by calls from a feature model manager 1008.

Once the Data Set Templates are setup, the next step is to define the Data Sets. A Data Set is tabular data which is a subset of a data from the Data Sources defined within a feature data manager 1006. Each Data Set must be uniquely identified by name within a feature data manager 1006. A Data Set is defined by a Data Set Template to define the columns and a set of filters to define the rows. For example, the filter could be the where clause in a SQL statement. Data Sets can be used by modelers 1003 or feature prediction managers 1011 or both. Data Sets are probably defined by calls from a modeler 1003.

2.2 Modeler 1003

In FIG. 17 the relationship between the modelers 1003, the predictors 1009, and the feature managers 1004.

In the setup of the model orchestrator 1007, each modeler 1003 should be uniquely named, at least within the subnet where it lives. However, in some embodiments, the uniqueness may not be enforceable. Next the access control is configured by installing a certificate for the modeler 1003 and installing the public key for each feature manager 1004 containing pertinent data. The public key for each feature prediction manager 1011 is also installed, to which this modeler 1003 can publish.

Once set up, the model orchestrator 1007 establishes a connection to each feature model manager 1008.

Then the Model Data Set templates are defined. A Model Data Set Template is a conjunction of Data Set Templates from feature data managers 1006. Each Data Set Template must be uniquely named within the feature manager 1004. The Data Set Templates on feature data managers 1006 are defined, as are the join conditions. A join condition is an equality expression between unique columns on two Data Sets. For example <Feature Manager A>.<Data Set Template 1>.<Column a>==<Feature Manager B>.<Data Set Template 2>.<Column b>. Each data set participating in the model data set must be joined such that a singular virtual tabular data set is defined.

After the templates are defined, the model data sets themselves are defined. A Model Data Set is a conjunction of Data Sets from feature data managers 1006. The Model Data Set is a row filter applied to a Model Data Set Template. Each Data Set must be uniquely named within a Model Data Set Template. Then the data sets on the feature data managers 1006 are defined. This filters the rows.

Next, the Modeling Parameters are defined. Modeling Parameters define how a Model is created on any Model Data Set which is derived from a Model Data Set Template. Each Modeling Parameters definition must be unique within a Model Data Set Template.

Then, a model is created and published. A model is created by applying Modeling Parameters to a Model Data Set. Each Model must be uniquely identified by name within a Model Data Set. A Model can be published to a feature prediction manager 1011. Publishing will persist the Model artifacts in the feature model managers 1008 and feature prediction managers 1011. Following are some of the artifacts which will be persisted to either the feature data manager 1008 and/or feature prediction manager 1011: Data set templates, model data set templates, and the model.

2.3 Prediction Orchestrator 1010

The prediction orchestrator 1010 setup begins with the configuration of the access control. This is done by installing a certificate for the feature prediction manager 1011 and installing the public key for each modeler 1003 allowed to access this prediction orchestrator 1010. The public key for each feature manager 1004 containing pertinent data is also installed. Each prediction orchestrator 1010 should be uniquely named, but in some embodiments this may not be enforced.

Next, a connection to each feature prediction manager 1011 is established and to a model orchestrator 1007. The model orchestrator 1007 will publish the Model Data Set Template and Model to the prediction orchestrator 1010.

The scoring data sets are then defined. A Scoring Data Set is a conjunction of Data Sets from the feature data managers 1006. It is a row filter applied to a Model Data Set Template. Each Data Set must be uniquely named within a Model Data Set Template. The data sets on the feature data managers 1006 are defined (this filters the rows).

Then the Scoring Parameters are defined. Scoring Parameters define how Scores are calculated on any Score Data Set which is derived from a Model Data Set Template. Each Scoring Parameters definition must be unique within a Model Data Set Template.

Finally, a Scoring Data Set is defined. Partial Scores are calculated on each feature manager 1004 in the feature prediction manager 1011. See FIG. 18A. Complete Scores are then calculated by the prediction orchestrator 1010 from the partial Scores. See FIG. 18B for the calculation combining the partial scores.

Figure 20:
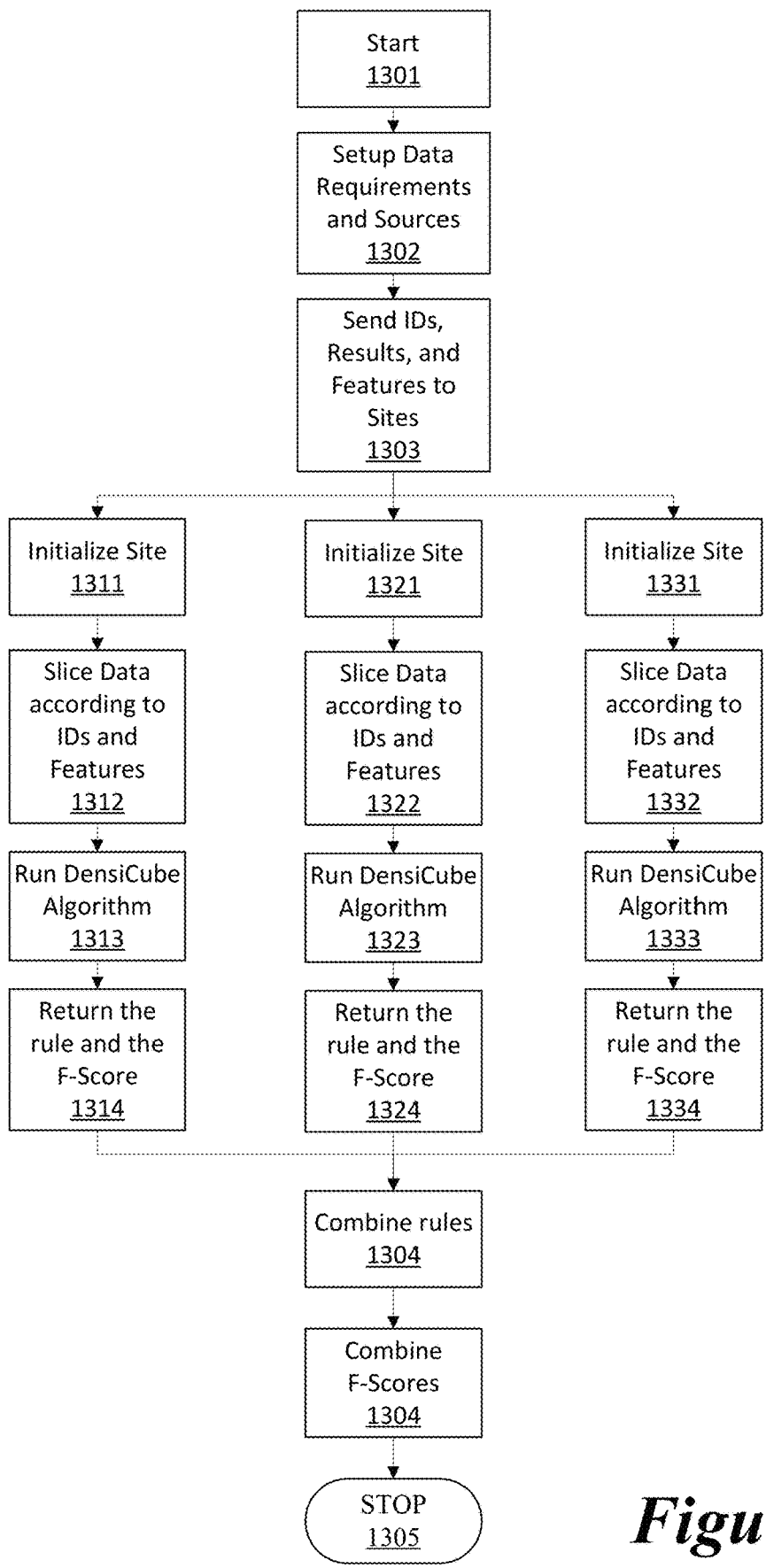
FIG. 20 is a flowchart showing the distributed nature of the Distributed DensiCube algorithm.

Looking to FIG. 20, we see the distributed nature of the Distributed DensiCube algorithm. The algorithm starts 1301 by initializing the software. The data requirements are setup, and the distributed sources of the data are identified 1302. Once the data features have been identified, a list of the IDs 801, the learning results (e.g. the Loan Results in 802), and the perhaps the desired features (e.g. Amount Borrowed n 802, Credit Score and Total Debt in 803, Home Ownership and Home Value in 804) are sent 1303 to the data silos 1002. In some embodiments, the desired features are not sent, instead, the feature manager 1004 on the data silo 1002 determines the features. While the FIG. 15 embodiment has a tri-state results (+, −, and blank), some embodiments only use a two state results set ("+" or blank). In the two state embodiment, there is no need to transmit the learning results; instead only a list of IDs is sent, with the implication that the IDs specified are the set of positive results.

The feature managers 1004 on each of the data silos 1002 then initialize the site 1311, 1321, 1331. The data on the silo 1002 is then sliced, using the list of IDs and the features 1312, 1322, 1332 into a data set of interest, by the feature data manager 1006. The DensiCube algorithm 1313, 1323, 1333 is then run by the feature model manager 1008 on the data of interest, as seen in FIGS. 9, 10, and 11. Once the DensiCube algorithm 1313, 1323, 1333 is complete, the rule and the F-score are finalized by the feature prediction managers 1011, the rule and F-Scores are returned 1314, 1324, 1334 to the prediction orchestrator 1010. In some embodiments, only the F-Scores are returned 1314, 1324, 1334, and the rules are maintained locally in the feature managers 1004.

Figure 18A:
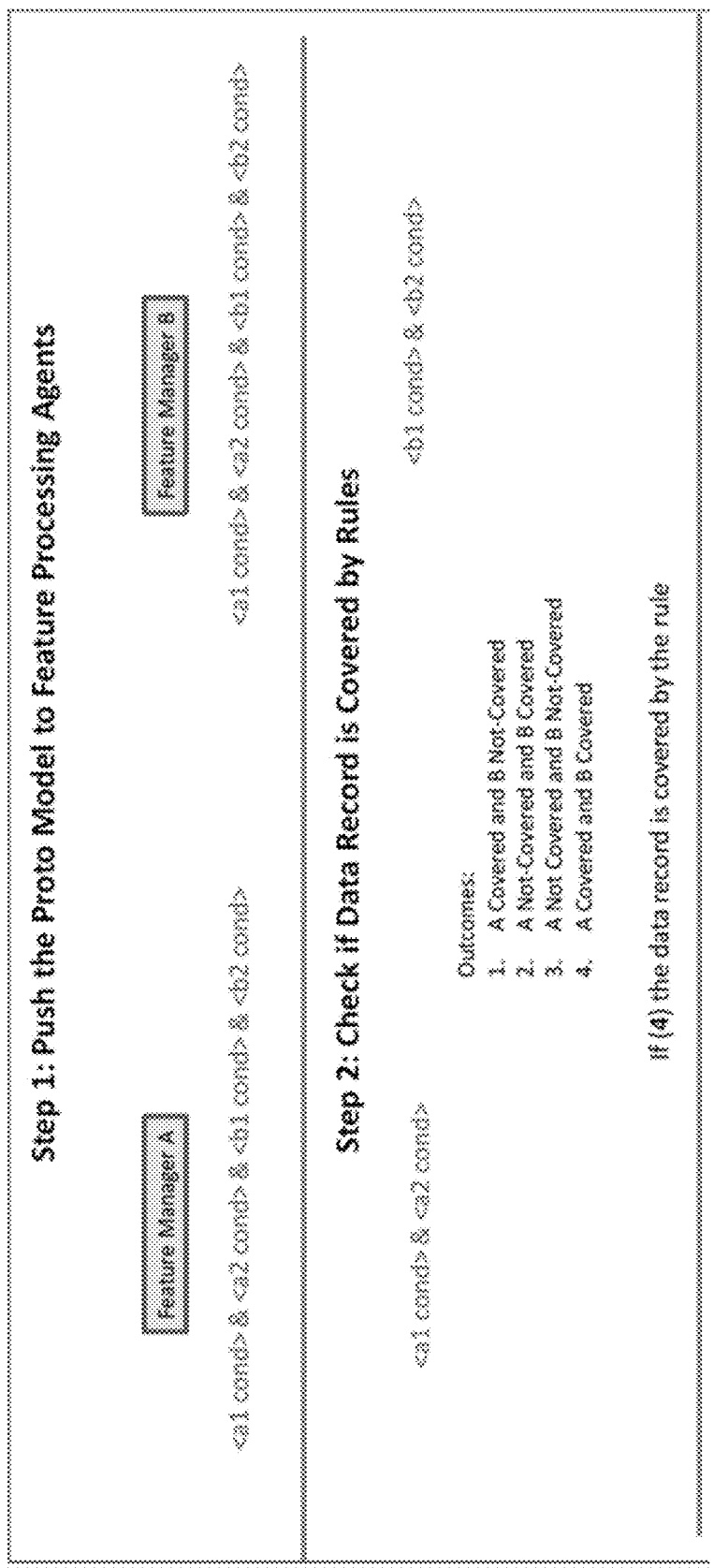
FIGS. 18A and 18B show modifications to the scoring algorithm to support privacy preserving in the data silos.
Figure 18B:
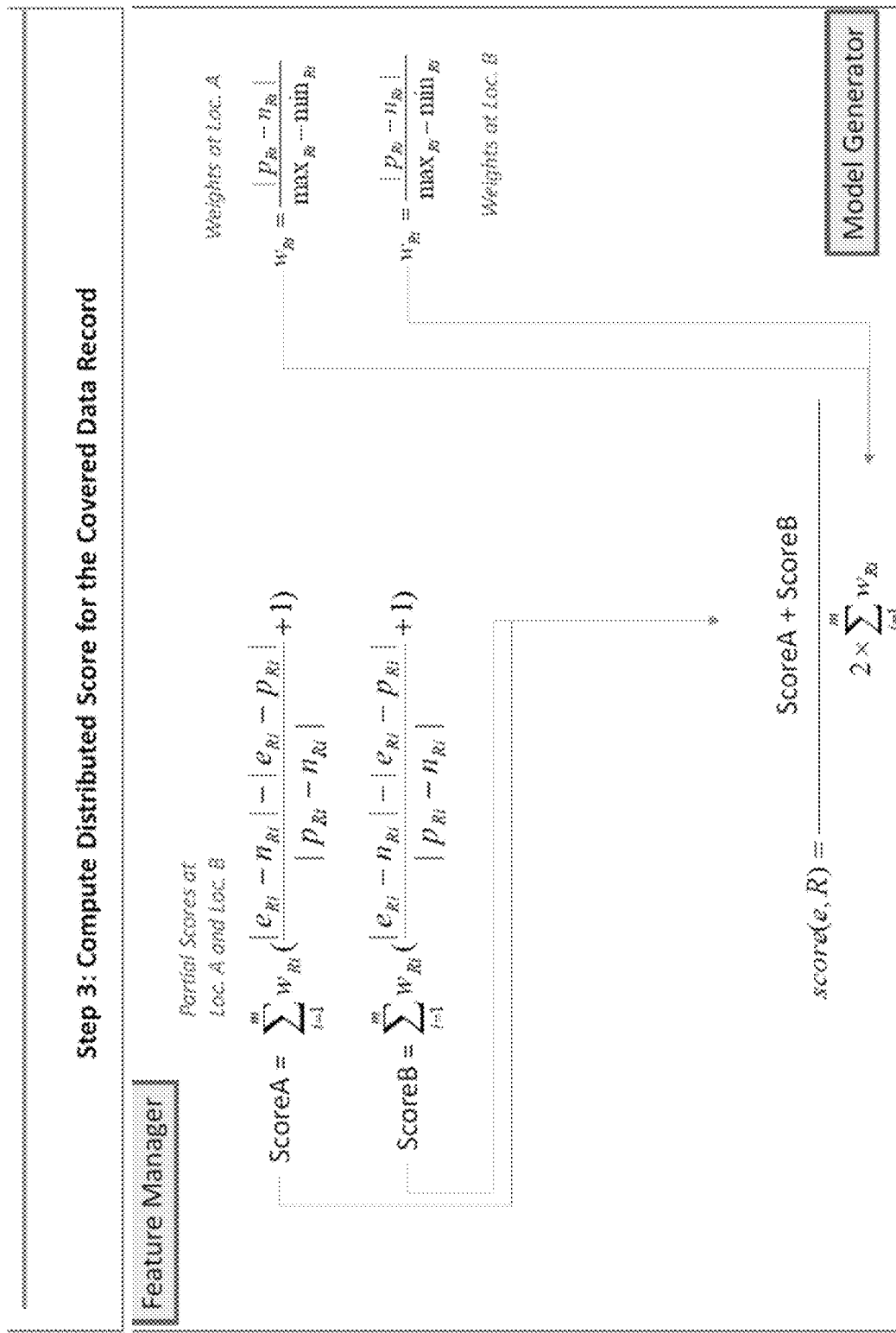

The rules, in some embodiments, are then returned to the prediction orchestrator 1010 where they are combined into an overall rule 1304, as seen in FIG. 18A. Next, the F-Scores are combined 1304 by the prediction orchestrator 1010 into an overall F-Score for the generated rule using the formulas in FIG. 18B. And the Distributed DensiCube algorithm is complete 1305.

Modifications to the scoring algorithms to support privacy preserving in the data silos.

The above description of the embodiments, alternative embodiments, and specific examples are given by way of illustration and should not be viewed as limiting. Further, many changes and modifications within the scope of the present embodiments may be made without departing from the spirit thereof, and the present inventions include such changes and modifications.

The invention claimed is:

1. An improved cash management apparatus comprising:
one or more payment rails connected to one or more banks;
a special purpose server connected to the one or more payment rails; and
a plurality of data storage facilities connected to the special purpose server, wherein the special purpose server is configured to retrieve a set of payment and receipt transactions from the plurality of data storage facilities for a given past date range, configured to separate the set of payment and receipt transactions by ledger accounts, configured to sort the payment and receipt transactions with proximate time frames, configured to perform an ARIMA analysis on the payment and receipt transactions in each ledger account of each currency account to create a model of expected inflow and outflows for each period for each ledger account for each currency account, configured to forecast a receipts forecast and a payments forecast for a future period, where the special purpose server subtracts the payments forecast from the receipts forecast and adds in a previous period cash balance to create a forecast cash balance time series for each currency account, configured to retrieve historical banking rate information and perform the ARIMA analysis on the historical banking rate information to create a forecast banking rate information time series, configured to form a distributed machine learning model using a machine learning algorithm that calculates an F-score and rule for each feature set in each silo and then combines the F-scores and the rules to create the distributed machine learning model, configured to execute the distributed machine learning model on multiple data silos on the forecast cash balance time series for each currency account and on the forecast banking rate information time series to determine a set of optimal cash transfers between each currency account and one or more sweep accounts, and configured to execute instructions to make payments and cash transfers.

2. The improved cash management apparatus of claim 1 wherein the set of payment and receipt transactions further includes transactions from multiple tenants from a bank.

3. The improved cash management apparatus of claim 1 wherein the future period is user-configurable.

4. The improved cash management apparatus of claim 1 wherein the payments forecast is modified to incorporate actual planned payments.

5. The improved cash management apparatus of claim 1 wherein the receipts forecast is modified to incorporate actual incoming receipts.

6. The improved cash management apparatus of claim 5 wherein the machine learning algorithm is K-means.

7. The improved cash management apparatus of claim 5 wherein the historical banking rate information is retrieved from the one or more banks over the one or more payment rails.

8. The improved cash management apparatus of claim 5 wherein the historical banking rate information includes interest rates, foreign exchange rates, and money transfer costs.

9. A method for managing cash in an organization, the method comprising:
- retrieving a set of payment and receipt transactions from a plurality of data storage facilities for a given past date range for a plurality of currency accounts with software on a special-purpose server that is connected to the plurality of data storage facilities;
- separating, with the software, the set of the payment and receipt transactions by ledger accounts;
- sorting, with the software, the set of the payment and receipt transactions with proximate time frames;
- performing, with the software, an ARIMA analysis in on the set of payment and receipt transactions in each ledger account of each currency account;
- creating, with the software, a model of expected inflows and outflows for each period for each ledger account for each currency account;
- forecasting, with the software, a receipts forecast and a payments forecast for a future period;
- subtracting, with the software on, the payments forecast from the receipts forecast and adding in a previous day cash balance, creating a forecast cash balance time series for each currency account;
- retrieving historical banking rate information to the software;
- performing, with the software, the ARIMA analysis on the historical banking rate information to create a forecast banking rate information time series;
- forming a distributed machine learning model using a machine learning algorithm that calculates an F-score and rule for each feature set in each of a plurality of silos and then combines the F-scores and the rules to create the distributed machine learning model;
- executing, using the software, the distributed machine learning model utilizing multiple data silos on the forecast cash balance time series for each currency account and on the forecast banking rate information time series to determine a set of optimal cash transfers between each currency account and one or more sweep accounts; and
- executing, by the software, instructions to make payments and cash transfers.

10. The method of claim 9 wherein the set of payment and receipt transactions further includes transactions from multiple tenants from a bank.

11. The method of claim 9 wherein the given past date range is user-configurable.

12. The method of claim 9 further comprising modifying the payments forecast by incorporating actual planned payments.

13. The method of claim 9 further comprising modifying the receipts forecast by incorporating actual planned receipts.

14. The method of claim 9 wherein the machine learning algorithm is Random Forrest.

15. The method of claim 9 wherein the historical banking rate information is retrieved from the one or more banks.

16. The method of claim 9 wherein the historical banking rate information includes interest rates, foreign exchange rates, and money transfer costs.

* * * * *